United States Patent
Maeda et al.

(10) Patent No.: US 8,602,420 B2
(45) Date of Patent: Dec. 10, 2013

(54) SPHERICAL ANNULAR SEAL MEMBER AND METHOD OF MANUFACTURING THE SAME

(75) Inventors: Takashi Maeda, Kanagawa (JP); Shuichi Kubota, Kanagawa (JP); Takeshi Furukido, Oita (JP); Toshiyuki Nishio, Kanagawa (JP)

(73) Assignee: Oiles Corporation, Tokyo (JP)

( * ) Notice: Subject to any disclaimer, the term of this patent is extended or adjusted under 35 U.S.C. 154(b) by 859 days.

(21) Appl. No.: 12/746,224

(22) PCT Filed: Dec. 4, 2008

(86) PCT No.: PCT/JP2008/003610
§ 371 (c)(1),
(2), (4) Date: Jun. 4, 2010

(87) PCT Pub. No.: WO2009/072295
PCT Pub. Date: Jun. 11, 2009

(65) Prior Publication Data
US 2010/0253011 A1    Oct. 7, 2010

(30) Foreign Application Priority Data
Dec. 5, 2007  (JP) .................................. 2007-315273

(51) Int. Cl.
*F16J 15/32* (2006.01)
(52) U.S. Cl.
USPC .......................................... 277/627; 277/650
(58) Field of Classification Search
USPC .................................. 277/611, 627, 650–654
See application file for complete search history.

(56) References Cited

U.S. PATENT DOCUMENTS

| 3,719,608 | A | 3/1973 | Olstowski |
| 5,765,838 | A * | 6/1998 | Ueda et al. ..................... 277/650 |
| 7,063,330 | B2 * | 6/2006 | Kubota et al. .................. 277/627 |
| 2004/0127599 | A1 | 7/2004 | Abadie et al. |
| 2006/0091616 | A1 | 5/2006 | Kuboto |

FOREIGN PATENT DOCUMENTS

| EP | 1550821 | 7/2005 |
| JP | 58-034230 | 2/1983 |
| JP | 58-21144 | 4/1983 |

(Continued)

OTHER PUBLICATIONS

International Search Report for PCT/JP2008/003610, mailed Mar. 3, 2009.

(Continued)

*Primary Examiner* — Gilbert Lee
(74) *Attorney, Agent, or Firm* — Nixon & Vanderhye, PC

(57) ABSTRACT

A spherical annular base member 33 is constructed such that a heat-resistant material 6 and a reinforcing member 5 are compressed and intertwined with each other so as to be provided with structural integrity. In an outer layer 34, a heat-resistant material 6, a solid lubricant constituted of a lubricating composition, and a reinforcing member 5 made from a metal wire net are compressed such that the solid lubricant and the heat-resistant material 6 are filled in meshes of the metal wire net of the reinforcing member 5, and the solid lubricant, the heat-resistant material 6, and the reinforcing member 5 are integrally formed in mixed form. An outer surface 36 of the outer layer 34 is formed into a smooth surface 39 in which a surface 37 constituted of the reinforcing member 5 and a surface 38 constituted by the solid lubricant are present in mixed form.

14 Claims, 9 Drawing Sheets

(56) References Cited

FOREIGN PATENT DOCUMENTS

| JP | 06-123362 | 5/1994 |
|---|---|---|
| JP | 8-311469 | 11/1996 |
| JP | 2003-97713 | 4/2003 |
| JP | 2003-206739 | 7/2003 |
| JP | 2004-151096 | 5/2004 |
| JP | 2006-327886 | 12/2006 |
| WO | 2004/038263 | 5/2004 |

OTHER PUBLICATIONS

Supplementary European Search Report for corresponding EP 08855823, mailed Jun. 3, 2013, 3 pages.

* cited by examiner

SPHERICAL ANNULAR SEAL MEMBER AND METHOD OF MANUFACTURING THE SAME

This application is the U.S. national phase of International Application No. PCT/JP2008/003610, filed 4 Dec. 2008, which designated the U.S. and claims priority to Japanese Patent Application No. 2007-315273, filed 5 Dec. 2007, the entire contents of each of which are hereby incorporated by reference.

TECHNICAL FIELD

The present invention relates to a spherical annular seal member used in a spherical pipe joint for an automobile exhaust pipe, as well as a method of manufacturing the same.

BACKGROUND ART

[Patent document 1] JP-B-58-21144
[Patent document 2] JP-A-58-34230
[Patent document 3] JP-B-3139179

As shown in FIG. 16, exhaust gases from an automobile engine are generally led to an exhaust manifold 600 and are released from a tail pipe 605 into the atmosphere through a catalytic converter 601, an exhaust pipe 602, a prechamber 603, and a silencer 604. These exhaust system parts are repeatedly subjected to stress by the rolling behavior and vibration of an engine 606. Particularly in the ease of the engine 606 rotating at high speed with high output, the stress applied to the exhaust system parts becomes considerably large. Accordingly, there is a possibility of resulting in the fatigue failure of the exhaust system parts, and there are also cases where the vibration of the engine 606 causes the exhaust system parts to resonate, thereby aggravating the quietness of the vehicle compartment.

To overcome these problems, means are adopted by, for instance, disposing a spherical pipe joint or a bellows-type joint at a required portion of the exhaust pipe so as to absorb the stress.

DISCLOSURE OF THE INVENTION

Problems that the Invention is to Solve

In comparison with the bellows-type joint, the seal member used in the spherical pipe joint described in the patent document 1 has the advantages of being able to attain a reduction in the manufacturing cost and excelling in durability. However, this seal member is constructed such that a heat-resistant material constituted by expanded graphite and a reinforcing member made from a metal wire net are compressed to cause the heat-resistant material to fill meshes of the metal wire net of the reinforcing member, such that the heat-resistant material and the reinforcing member are integrated in mixed form. Therefore, because of such as the proportion of the reinforcing member to the heat-resistant material and the degree of compression of the heat-resistant material and the reinforcing member, this seal member has the problem of leakage of exhaust gases through the spherical annular seal member itself, as well as the problem of generation of abnormal frictional noise due to the presence of the heat-resistant material on the obverse surface of the partially convex spherical surface which slidably comes into contact with a mating member. For example, if the proportion of the reinforcing member to the heat-resistant material is excessively large, or the degree of pressurization of the heat-resistant material is low, there are possibilities that the degree of sealing by the heat-resistant material with respect to infinitesimal passages (gaps) produced around the reinforcing member decreases to cause leakage at an initial stage, and that exhaust gases leak at an early stage due to such as the oxidation loss of the heat-resistant material under high temperatures. Meanwhile, if the heat-resistant material in the partially convex spherical surface is greatly pressurized, or the proportion of the heat-resistant material to the reinforcing member in the partially convex spherical surface is extremely large, stick-slip can result, possibly causing the generation of abnormal frictional noise.

As for the seal member described in the patent document 2, its sliding surface (obverse surface of the partially convex spherical surface) is formed into a smooth surface in which a reinforcing member made from a deformed and intertwined metal wire net and a solid lubricant filled and held in the meshes of the reinforcing member are integrated in mixed form. Thus, this seal member has the advantage of being able to avoid as much as possible the drawback of the generation of abnormal frictional noise due to the presence of the heat-resistant material on the obverse surface of the partially convex spherical surface of the seal member described in the patent document 1, which slidably comes into contact with the mating member. As such, however, the problem of the leakage of exhaust gases which is inherently present in the seal member still remains unresolved.

As for the seal member described in the patent document 3, the obverse surface of the partially convex spherical surface, which is its sliding surface, is formed into a smooth surface in which a reinforcing member made from a deformed and intertwined metal wire net and a solid lubricant filled and held in the meshes of the reinforcing member are integrated in mixed form, in the same way as the seal member described in the patent document 2. Since it particularly contains boron nitride in the solid lubricant, the seal member described in the patent document 3 has advantages in that it more excels in the sliding characteristics in a high temperature range than the seal member described in the patent document 2, and that there is no generation of abnormal frictional noise in sliding with the mating member. However, the seal member described in the patent document 3 is also inferior in the adherence of the solid lubricant onto the obverse surface of the heat-resistant material, and it is difficult to form a firm coating layer of the solid lubricant on the obverse surface of the heat-resistant material, with the result that this seal member has the problem that such as the exfoliation of the solid lubricant from the partially convex spherical surface, i.e., the sliding surface, can occur, frequently generating abnormal frictional noise.

The present invention concerns the improvement of the spherical annular seal member described in the above-described patent document 3, and its object is to provide a spherical annular seal member which is capable of eliminating as much as possible the leakage of exhaust gases through the spherical annular seal member itself, and permits the formation of a firm coating layer on the obverse surface of the heat-resistant material by improving the adherence of the solid lubricant onto the obverse surface of the heat-resistant material, and which is capable of eliminating the generation of abnormal frictional noise in sliding with a mating member and exhibits stable sealing characteristics, as well as a method of manufacturing the same.

Means for Solving the Problems

A spherical annular seal member in accordance with the present invention is a spherical annular seal member for use in an exhaust pipe joint, comprising: a spherical annular base member defined by a cylindrical inner surface, a partially convex spherical surface, and large- and small-diameter-side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite, filling meshes of the reinforcing member, and compressed in such a manner as to be formed integrally with the reinforcing member in mixed form, and wherein, in the outer layer, a heat-resistant material containing expanded graphite, a solid lubricant constituted of a lubricating composition containing at least 70 to 85 wt. % of hexagonal boron nitride, 0.1 to 10 wt. % of boron oxide, and 5 to 20 wt. % of hydrated alumina, and a reinforcing member made from a metal wire net are compressed such that the solid lubricant and the heat-resistant material are filled in meshes of the metal wire net of the reinforcing member, and the solid lubricant, the heat-resistant material, and the reinforcing member are integrally formed in mixed form, an outer surface of the outer layer being formed into a smooth surface in which a surface constituted by the reinforcing member and a surface constituted by the solid lubricant are present in mixed form.

According to the spherical annular seal member of the invention, in the outer layer formed integrally on the partially convex spherical surface of the spherical annular base member constituting a sliding surface with a mating member, a heat-resistant material containing expanded graphite, a solid lubricant constituted of a lubricating composition containing 70 to 85 wt. % of hexagonal boron nitride, 0.1 to 10 wt. % of boron oxide, and 5 to 20 wt. % of hydrated alumina, and a reinforcing member made from a metal wire net are compressed such that the solid lubricant and the heat-resistant material are filled in meshes of the metal wire net of the reinforcing member, and the solid lubricant, the heat-resistant material, and the reinforcing member are integrally formed in mixed form. Meanwhile, an outer surface of the outer layer is formed into a smooth surface in which a surface constituted by the reinforcing member and a surface constituted by the solid lubricant, which is firmly adhered to the surface of the heat-resistant material, are present in mixed form. Accordingly, it is possible to prevent the solid lubricant from dropping off from the outer surface, with the result that since the spherical annular seal member slides on the mating member at the smooth surface where the solid lubricant and the reinforcing member are present in mixed form, it is possible to eliminate the generation of abnormal frictional noise as much as possible.

In the above-described solid lubricant, hexagonal boron nitride exhibits excellent lubricity particularly in a high-temperature range, and accounts for 70 to 85 wt. % as a principal component. The boron oxide, per se, among the components does not exhibit lubricity, but by being contained in the hexagonal boron nitride, the boron oxide brings out the lubricity inherent in the boron nitride and contributes to the reduction of friction particularly in a high-temperature range. Further, its compounding amount is 0.1 to 10 wt. %, preferably 3 to 5 wt. %. In addition, although the hydrated alumina, per se, among the components does not exhibit lubricity, the hydrated alumina improves the adherence of the solid lubricant onto the heat-resistant material surface and demonstrates an effect in the formation of a firm adherent layer, and exhibits the function of bringing out the lubricity of the hexagonal boron nitride by promoting the sliding between layers of plate crystals of the hexagonal boron nitride. Furthermore, the compounding amount of hydrated alumina is 5 to 20 wt. %, preferably 7 to 15 wt. %. If the content of the hydrated alumina is less than 5 wt. %, there is no effect on the improvement of the above-described adherence of the solid lubricant, and if it is contained in excess of 20 wt. %, the aqueous dispersion becomes excessively viscous during manufacturing, which aggravates the adhering operation of brushing or the like.

The hydrated alumina is a compound which is expressed by a compositional formula $Al_2O_3.nH_2O$ (in the compositional formula, $0<n<3$). In this compositional formula, n is a number which is normally in excess of 0 and less than 3, preferably 0.5 to 2, more preferably 0.7 to 1.5 or thereabouts. As the hydrated alumina, it is possible to cite alumina monohydrate (aluminum hydroxide oxide) such as boehmite ($Al_2O_3.H_2O$) and diaspore ($Al_2O_3.H_2O$), alumina trihydrate such as gibbsite ($Al_2O_3.3H_2O$) and bayerite ($Al_2O_3.3H_2O$), pseudoboehmite, and the like. At least one of them is suitably used.

The aforementioned lubricating composition may be such that, in a lubricating composition containing 70 to 85 wt. % of hexagonal boron nitride, 0.1 to 10 wt. % of boron oxide, and 5 to 20 wt. % of hydrated alumina, polytetrafluoroethylene resin is contained at a rate of not more than 200 parts by weight, preferably 50 to 150 parts by weight, with respect to 100 parts by weight of that lubricating composition. This polytetrafluoroethylene resin, per se, possesses low frictional properties, and by being contained in the lubricating composition, polytetrafluoroethylene resin improves the low frictional properties of the lubricating composition, imparts low frictional properties to the solid lubricant constituted of the lubricating composition, and is capable of avoiding the generation of abnormal frictional noise as much as possible without causing stick-slip in the friction with the mating member. In addition, polytetrafluoroethylene resin exhibits the action of enhancing the ductility of the lubricating composition during compression forming. As a result, it is possible to form a film coating layer.

In the spherical annular seal member in accordance with the invention, in the spherical annular base member and the outer layer, preferably, the reinforcing member made from the metal wire net is contained at a rate of 40 to 65 wt. %, the lubricating composition and the heat-resistant material containing expanded graphite are contained at a rate of 35 to 60 wt. %, and the heat-resistant material and the solid lubricant in the spherical annular base member and the outer layer have a density of 1.20 to 2.00 $Mg/m^3$. In addition, in the outer layer, preferably, the reinforcing member made from the metal wire net is contained at a rate of 60 to 75 wt. %, and the solid lubricant and the heat-resistant material containing expanded graphite are contained at a rate of 25 to 40 wt. %.

If, in the spherical annular base member and the outer layer, the reinforcing member is contained at a rate of more than 65 wt. %, and the heat-resistant material is contained at a rate of less than 35 wt. %, the sealing (filling) by the heat-resistant material with respect to a multiplicity of infinitesimal passages (gaps) occurring around the reinforcing member fails to be effected completely. In consequence, leakage of exhaust gases at an early stage can result, and even if the sealing of the infinitesimal passages has been completely effected throughout, such sealing can be lost at an early stage due to such as the oxidation loss of the heat-resistant material under high temperatures, causing the leakage of exhaust gases at an early stage. On the other hand, if the reinforcing member is contained at a rate of less than 40 wt. %, and the heat-resistant material is contained at a rate of more than 60 wt. %, the amount of reinforcing member becomes extremely small in the outer layer and in the vicinities of the outer layer.

Consequently, reinforcement for the heat-resistant material at the outer surface and in the vicinities of the outer surface fails to be effected satisfactorily. Hence, the exfoliation (drop off) of the heat-resistant material occurs noticeably, and it becomes difficult to expect a reinforcement effect derived from the reinforcing member.

In addition, in the heat-resistant material and the solid lubricant in the spherical annular base member and the outer layer, if the heat-resistant material has a smaller density than 1.20 Mg/m$^3$, leakage of exhaust gases can result over long periods of use. On the other hand, if the heat-resistant material has a greater density than 2.00 Mg/m$^3$, abnormal frictional noise is often likely to occur in friction with the mating member.

It should be noted that, in the spherical annular seal member in accordance with the invention, since the outer layer has an outer surface formed by an exposed surface in which a surface constituted by the reinforcing member and a surface constituted by the solid lubricant are present in mixed form, it is possible to ensure smoother sliding with the mating member which is in contact (slides) with the outer surface of the outer layer. Furthermore, the surface constituted of the solid lubricant in the outer surface can be retained by the surface constituted of the reinforcing member, and it is possible to appropriately effect the transfer of the solid lubricant onto the surface of the mating member from the outer surface of the outer layer as well as the scraping of the an excess solid lubricant transferred onto the surface of the mating member. As a result, it is possible to ensure smooth sliding over extended periods of time, and abnormal frictional noise is not generated in the sliding with the mating member.

In the spherical annular seal member in accordance with the invention, the heat-resistant material may contain expanded graphite and at least one of 0.05 to 5.0 wt. % of phosphorus pentoxide and 1.0 to 16.0 wt. % of a phosphate as an oxidation inhibitor.

The heat-resistant material containing expanded graphite and at least one of phosphorus pentoxide and a phosphate as an oxidation inhibitor is able to improve the heat resistance and the oxidation loss characteristic of the spherical annular seal member itself, and permits use of the spherical annular seal member in a high-temperature range.

A method of manufacturing a spherical annular seal member in accordance with the invention which is used in an exhaust pipe joint and includes a spherical annular base member defined by a cylindrical inner surface, a partially convex spherical surface, and large- and small-diameter-side annular end faces of the partially convex spherical surface, and an outer layer formed integrally on the partially convex spherical surface of the spherical annular base member, comprises the steps of: (a) preparing a heat-resistant sheet member composed of expanded graphite; (b) preparing a reinforcing member made from a metal wire net obtained by weaving or knitting fine metal wires, superposing the reinforcing member on the heat-resistant sheet member to form a superposed assembly, and convoluting the superposed assembly into a cylindrical form, so as to form a tubular base member; (c) preparing an aqueous dispersion formed by dispersedly containing at least a hexagonal boron nitride powder and a boron oxide powder in an alumina sol in which hydrated alumina particles are dispersed in water containing an acid as a dispersion medium, and which exhibits a hydrogen ion concentration of 2 to 3, the aqueous dispersion containing as a solid content a lubricating composition containing at least 70 to 85 wt. % of the hexagonal boron nitride, 0.1 to 10 wt. % of boron oxide, and 5 to 20 wt. % of hydrated alumina; (d) preparing another heat-resistant sheet member, coating one surface of the another heat-resistant sheet member with the aqueous dispersion, and drying the same, so as to form on the surface of the heat-resistant sheet member a coating layer of a solid lubricant containing at least 70 to 85 wt. % of hexagonal boron nitride, 0.1 to 10 wt. % of boron oxide, and 5 to 20 wt. % of hydrated alumina; (e) inserting the heat-resistant sheet member with the coating layer formed thereon between two layers constituted of a metal wire net of another reinforcing member made from the metal wire net obtained by weaving or knitting a fine metal wire, causing the reinforcing member with the heat-resistant sheet member inserted between the layers constituted of the metal wire net to be fed into a nip between a pair of cylindrical rollers and to be pressurized, such that the heat-resistant sheet member and the coating layer of the solid lubricant formed on an obverse surface of the heat-resistant sheet member are filled in meshes of the metal wire net of the reinforcing member, thereby forming a flat outer layer forming member in which a surface constituted by the reinforcing member and a surface constituted by the coating layer of the solid lubricant are exposed on the obverse surface in mixed form; (f) winding the outer layer forming member around an outer peripheral surface of the tubular base member with the coating layer of the solid lubricant placed on an outer side, so as to form a cylindrical preform; and (g) fitting the cylindrical preform over an outer peripheral surface of a core of a die, placing the core into the die, and compression-forming the cylindrical preform in the die in an axial direction of the core, wherein the spherical annular base member is formed such that the heat-resistant material containing expanded graphite and the reinforcing member made from the metal wire net are compressed and intertwined with each other so as to be provided with structural integrity, and wherein, in the outer layer, the heat-resistant material containing expanded graphite, the solid lubricant constituted of the lubricating composition containing at least 70 to 85 wt. % of hexagonal boron nitride, 0.1 to 10 wt. % of boron oxide, and 5 to 20 wt. % of hydrated alumina, and the reinforcing member made from the metal wire net are compressed such that the solid lubricant and the heat-resistant material are filled in the meshes of the metal wire net of the reinforcing member, and the solid lubricant, the heat-resistant material, and the reinforcing member are integrally formed in mixed form, an outer surface of the outer layer being formed into the smooth surface in which the surface constituted by the reinforcing member and the surface constituted by the solid lubricant are present in mixed form.

According to the method of manufacturing a spherical annular seal member in accordance with the invention, it is possible to firmly form the coating layer of the solid lubricant constituted of the lubricating composition containing at least 70 to 85 wt. % of hexagonal boron nitride, 0.1 to 10 wt. % of boron oxide, and 5 to 20 wt. % of hydrated alumina on one surface of the heat-resistant sheet. In addition, as that coating layer is retained by the reinforcing member made from a metal wire net, the outer surface of the outer layer of the spherical annular seal member can be constructed by an exposed surface in which the surface constituted by the reinforcing member and the surface constituted by the solid lubricant are present in mixed form. Therefore, it is possible to ensure smoother sliding with the mating member which is in contact (slides) with the outer surface of the outer layer. Furthermore, the surface constituted of the solid lubricant in the exposed surface can be retained by the surface constituted of the reinforcing member, and it is possible to appropriately effect the transfer of the solid lubricant onto the surface of the mating member from the outer surface of the outer layer as well as the scraping of the an excess film of the solid lubricant transferred onto the surface of the mating member. As a result, it is possible to obtain a spherical annular seal member which is able to ensure smooth sliding over extended periods of time, and in which abnormal frictional noise is not generated in the sliding with the mating member.

In the method of manufacturing a spherical annular seal member in accordance with the invention, in a preferred example, in the spherical annular base member and the outer layer, the reinforcing member made from the metal wire net is contained at a rate of 40 to 65 wt. %, the solid lubricant and the heat-resistant material containing expanded graphite are contained at a rate of 35 to 65 wt. %, and the heat-resistant material and the solid lubricant in the spherical annular base member and the outer layer have a density of 1.20 to 2.00 $Mg/m^3$. In addition, in the outer layer, the reinforcing member made from the metal wire net is contained at a rate of 60 to 75 wt. %, and the solid lubricant and the heat-resistant material containing expanded graphite are contained at a rate of 25 to 40 wt. %.

Advantages of the Invention

In accordance with the invention, it is possible to provide a spherical annular seal member which is capable of eliminating the leakage of exhaust gases, of improving the retaining characteristic of the solid lubricant on the sliding surface, and of eliminating the generation of abnormal frictional noise, and which has stable sealing characteristics, as well as a method of manufacturing the same.

BEST MODE FOR CARRYING OUT THE INVENTION

Hereafter, a more detailed description will be given of the present invention and the mode for carrying it out with reference to the preferred embodiments shown in the drawings. It should be noted that the present invention is not limited to these embodiments.

Figure 1:
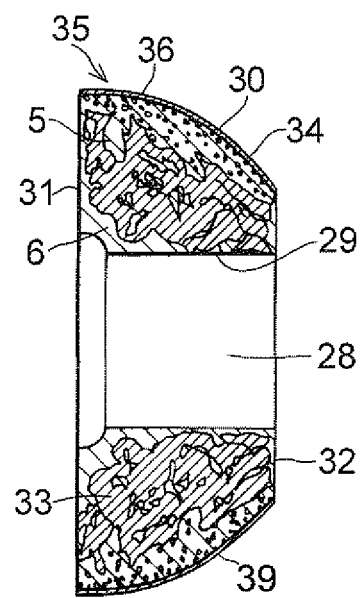
FIG. 1 is a vertical cross sectional view of a spherical annular seal member which is manufactured in accordance with an embodiment of the invention.

A description will be given of the constituent materials of a spherical annular seal member in accordance with the invention and a method of manufacturing the spherical annular seal member.

<Concerning Heat-Resistant Sheet Member I>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., a natural flake graphite powder having a particle size of 30 to 80 meshes is added to it, and reaction is allowed to take place for 30 minutes. After the reaction, an acidized graphite powder subjected to suction filtration is separated, and a cleaning operation is repeated twice in which the acidized graphite powder is agitated in water for 10 minutes and is then subjected to suction filtration, thereby sufficiently removing the sulfuric acid content from the acidized graphite powder. Then, the acidized graphite powder with the sulfuric acid content sufficiently removed is dried for 3 hours in a drying furnace held at a temperature of 110° C., and this is used as an acidized graphite powder.

The aforementioned acidized graphite powder is subjected to heat (expansion) treatment for 1 to 10 seconds at a temperature of 950 to 1200° C. to generate pyrolysis gases, to thereby form expanded graphite particles (expansion factor: 240- to 300-fold) expanded by expanding gaps between graphite layers by the gas pressure. An expanded graphite sheet with a desired thickness is fabricated by roll-forming these expanded graphite particles by feeding them to a double-roller apparatus with its roll nip adjusted to a desired nip, and this expanded graphite sheet is used as a heat resistant sheet member I.

<Concerning Heat-Resistant Sheet Members II and III>

While agitating the aforementioned acidized graphite powder, a solution in which at least one of aqueous orthophosphoric acid of an 84% concentration as a phosphoric acid and aqueous aluminum primary phosphate of a 50% concentration as a phosphate is diluted by methanol is compounded with the acidized graphite material by spraying, and is agitated uniformly to prepare a wet mixture. This wet mixture is dried for 2 hours in the drying furnace held at a temperature of 120° C. Then, this dried mixture is subjected to heat (expansion) treatment for 1 to 10 seconds at a temperature of 950 to 1200° C. to generate pyrolysis gases, to thereby form expanded graphite particles (expansion factor: 240- to 300-fold) expanded by expanding gaps between graphite layers by the gas pressure. In this expansion treatment process, orthophosphoric acid among the components undergoes dehydration reaction to generate phosphorus pentoxide, while, as for the aluminum primary phosphate, water in its structural formula is desorbed. An expanded graphite sheet with a desired thickness is fabricated by roll-forming these expanded graphite particles by feeding them to a double-roller apparatus with its roll nip adjusted to a desired nip, and these expanded graphite sheets are respectively used as heat resistant sheet members II and III.

Phosphorus pentoxide or aluminum primary phosphate is contained in the heat-resistant sheet member II thus fabricated, while phosphorus pentoxide and aluminum primary phosphate are contained in the heat-resistant sheet member III. The expanded graphite which contains at least one of the phosphoric acid and the phosphate permits use at, for example, 500° C. or in a high-temperature range exceeding 500° C. since the heat resistance of the expanded graphite itself is improved and the oxidation inhibiting action is imparted thereto.

Here, as the usable phosphoric acid, it is possible to cite, in addition to orthophosphoric acid, metaphosphoric acid, polyphosphoric acid, polymetaphosphoric acid, and the like. As the phosphate, it is possible to cite, in addition to the aluminum primary phosphate, lithium primary phosphate, lithium secondary phosphate, calcium primary phosphate, calcium secondary phosphate, aluminum secondary phosphate, and the like.

As the heat-resistant sheet members, sheet members having a density of 1.0 to 1.15 Mg/m$^3$ or thereabouts and a thickness of 0.3 to 0.6 mm or thereabouts are suitably used.

<Concerning Reinforcing Member>

As a reinforcing member, a metal wire net is used which is formed by weaving or knitting by using one or more fine metal wires including, as an iron-based wire, a stainless steel wire made of such as austenitic stainless steels SUS 304, SUS 3105, and SUS 316, a ferritic stainless steel SUS 430, or an iron wire (JIS G 3532) or a galvanized iron wire (JIS G 3547), or, as a copper-based wire, a copper-nickel alloy (cupronickel) wire, a copper-nickel-zinc alloy (nickel silver) wire, a brass wire, or a beryllium copper wire.

Figure 5:
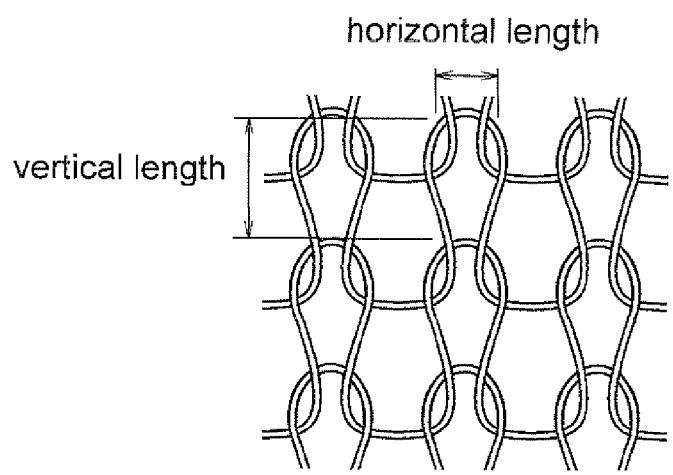
FIG. 5 is a plan view illustrating meshes of a metal wire net of the reinforcing member.

As for the fine metal wire for forming the metal wire net, a fine metal wire having a diameter of 0.28 to 3.2 mm or thereabouts is used in terms of its wire diameter. In terms of the mesh size (see FIG. 5 showing a braided metal wire net) of the mesh of the metal wire net of a spherical annular base member formed by the fine metal wire of that wire diameter, a metal wire net having a vertical length of 4 to 6 mm and a horizontal length of 3 to 5 mm or thereabouts is suitably used. In terms of the mesh size (see FIG. 5) of the mesh of the metal wire net for an outer layer, a metal wire net having a vertical length of 2.5 to 3.5 mm and a horizontal length of 1.5 to 5 mm or thereabouts is suitably used.

<Concerning Solid Lubricant>

The solid lubricant is constituted by a lubricating composition containing 70 to 85 wt. % of hexagonal boron nitride (hereafter abbreviated as "h-BN"), 0.1 to 10 wt. % of boron oxide, and 5 to 20 wt. % of hydrated alumina, or a lubricating composition containing a polytetrafluoroethylene resin (hereafter abbreviated as "PTFE") powder at a rate of not more than 200 parts by weight, preferably 50 to 150 parts by weight, with respect to 100 parts by weight of that lubricating composition.

In the manufacturing process, this solid lubricant is an aqueous dispersion in which an h-BN powder and a boron oxide powder are dispersedly contained in an alumina sol in which hydrated alumina particles are dispersedly contained in water containing an acid as a dispersion medium, and which exhibits a hydrogen ion concentration (pH) of 2 to 3. This solid lubricant is used in the form of an aqueous dispersion in which 30 to 50 wt. % of a lubricating composition containing 70 to 85 wt. % of the h-BN powder, 0.1 to 10 wt. % of boron oxide, and 5 to 20 wt. % of hydrated alumina is dispersedly contained as a solid content. Alternatively, this aqueous dispersion may be one in which, 30 to 50 wt. % of a lubricating composition containing 100 parts by weight of a lubricating composition containing 70 to 85 wt. % of h-BN, 0.1 to 10 wt. % of boron oxide, and 5 to 20 wt. % of hydrated alumina, and PTFE at a rate of not more than 200 parts by weight, preferably 50 to 150 parts by weight is dispersedly contained as a solid content. The h-BN, boron oxide, and PTFE for forming the aqueous dispersion are preferably in the form of as fine powders as possible, and fine powders having average particle sizes of 10 μm or less, more preferably 0.5 μm or less, are suitably used.

The acid which is contained in water serving as a dispersion medium for the alumina sol in the aqueous dispersion acts as a deflocculant for stabilizing the alumina sol. As the acid, it is possible to cite inorganic acids such as hydrochloric acid, nitric acid, sulfuric acid, and amidosulfuric acid, but nitric acid is particularly preferable.

The hydrated alumina for forming the alumina sol in the aqueous dispersion is a compound which is expressed by a compositional formula $Al_2O_3 \cdot nH_2O$ (in the compositional formula, $0<n<3$). In this compositional formula, n is a number which is normally in excess of 0 and less than 3, preferably 0.5 to 2, more preferably 0.7 to 1.5 or thereabouts. As the hydrated alumina, it is possible to cite alumina monohydrate (aluminum hydroxide oxide) such as boehmite ($Al_2O_3 \cdot H_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of the method of manufacturing the spherical annular seal member composed of the above-described constituent materials.

Figure 3:
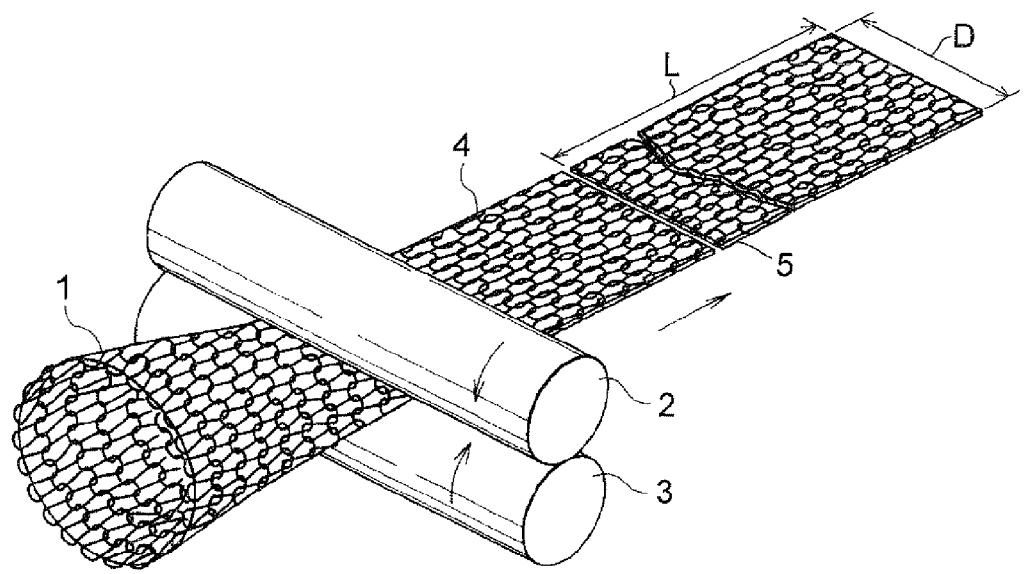
FIG. 3 is a diagram explaining a method of forming a reinforcing member in the process of manufacturing the spherical annular seal member in accordance with the invention.

(First Process) As shown in FIG. 3, a belt-shaped metal wire net 4 with a predetermined width D is fabricated by passing into a nip between rollers 2 and 3 a cylindrical braided metal wire net 1 formed by knitting fine metal wires with a wire diameter of 0.28 to 0.32 into a cylindrical shape and having a mesh size of 4 to 6 mm or thereabouts (vertical) and 3 to 5 mm or thereabouts (horizontal) (see FIG. 5). The belt-shaped metal wire net 4 is cut into a predetermined length L, thereby preparing a reinforcing member 5.

Figure 4:
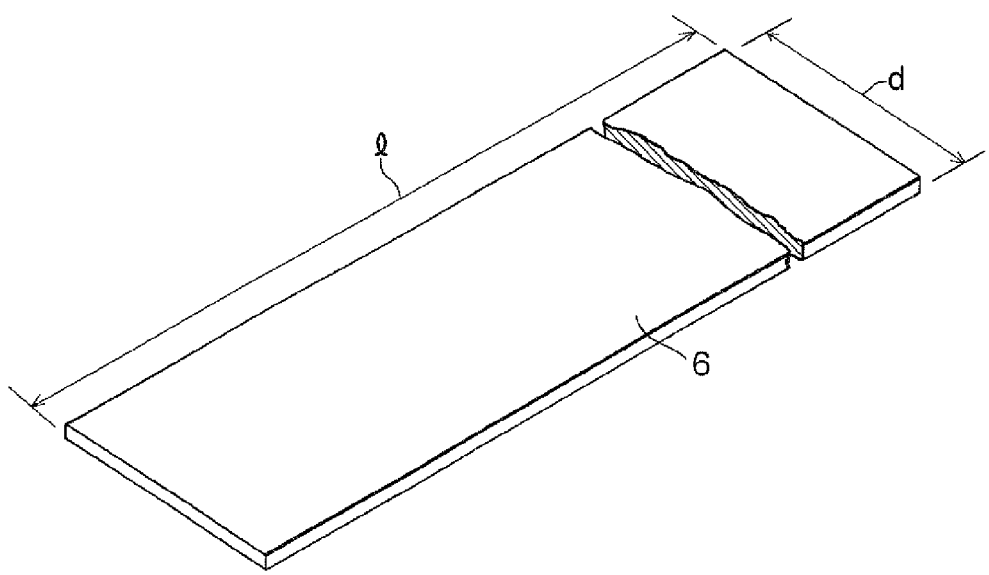
FIG. 4 is a perspective view of a heat-resistant material in the process of manufacturing the spherical annular seal member in accordance with the invention.

(Second Process) As shown in FIG. 4, a heat-resistant material (a sheet composed of expanded graphite or expanded graphite containing at least one of phosphoric acid and a phosphate) 6 is prepared which has a width d of 1.10×D to 2.10×D with respect to the width D of the reinforcing member 5 and a length l of 1.30×L to 2.70×L with respect to the length L of the reinforcing member 5, and which has a density of 1 to 1.15 Mg/m$^3$ and a thickness of 0.3 to 0.6 mm.

Figure 6:
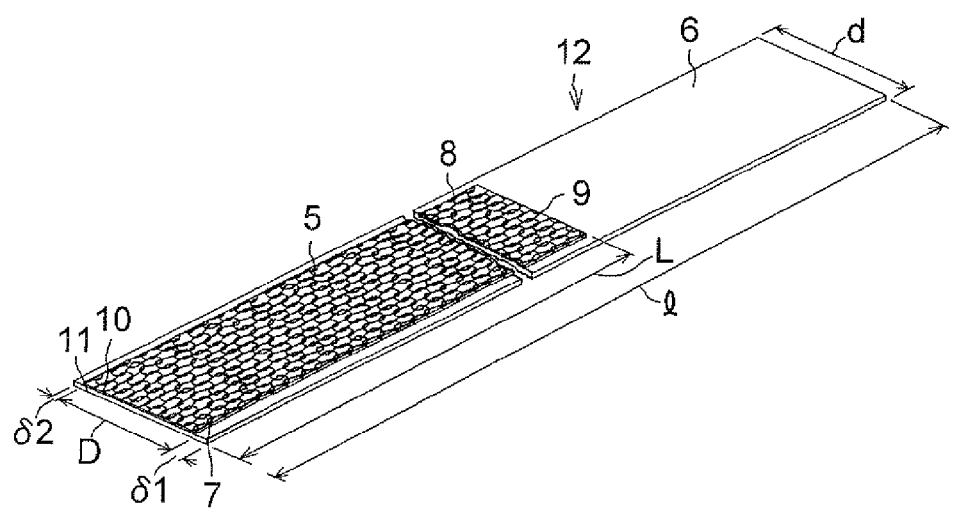
FIG. 6 is a perspective view of a superposed assembly in the process of manufacturing the spherical annular seal member in accordance with the invention.

(Third Process) A superposed assembly 12, in which the heat-resistant material 6 and the reinforcing member 5 are superposed on top of each other, is obtained as follows: To ensure that the heat-resistant material 6 is wholly exposed at least on a large-diameter-side annular end face 31 which is an annular end face on one axial end side of a partially convex spherical outer surface 30 (see FIG. 2) in a spherical annular seal member 39 (see FIG. 1) which will be described later, as shown in FIG. 6, the heat-resistant material 6 is made to project in the widthwise direction by 0.1×D to 0.8×D, at maximum, from one widthwise end 7 of the reinforcing member 5, which becomes the large-diameter-side annular end face 31 of the partially convex spherical outer surface 30. Also, the amount of widthwise projection, δ1, of the heat-resistant material 6 from the end 7 becomes greater than the amount of its widthwise projection, δ2, from the other widthwise end 8 of the reinforcing member 5, which becomes a small-diameter side annular end face 32 of the partially convex spherical outer surface 30. Also, the heat-resistant material 6 is made to project in the longitudinal direction by 0.3×L to 1.7×L, at maximum, from one longitudinal end 9 of the reinforcing member 5. Also, the other longitudinal end 10 of the reinforcing member 5 and a longitudinal end 11 of the heat-resistant material 6 corresponding to that end 10 are made to agree with each other.

Figure 7:
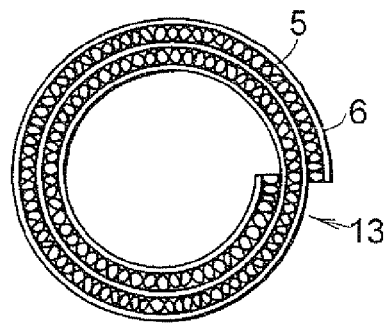
FIG. 7 is a plan view of a tubular base member in the process of manufacturing the spherical annular seal member in accordance with the invention.
Figure 8:
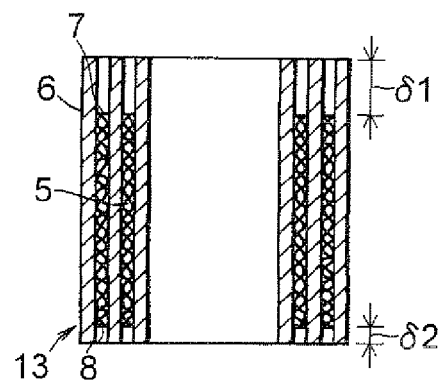
FIG. 8 is a vertical cross-sectional view of the tubular base member shown in FIG. 7.

(Fourth Process) As shown in FIG. 7, the superposed assembly 12 is convoluted spirally with the heat-resistant material 6 placed on the inner side, such that the heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of 1.30×L to 2.70×L with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the heat-resistant material 6 on its one widthwise end side projects in the widthwise direction by 81 from the one end 7 of the reinforcing member 5, and the heat-resistant material 6 on its other widthwise end side projects in the widthwise direction by 82 from the other end 8 of the reinforcing member 5.

Figure 9:
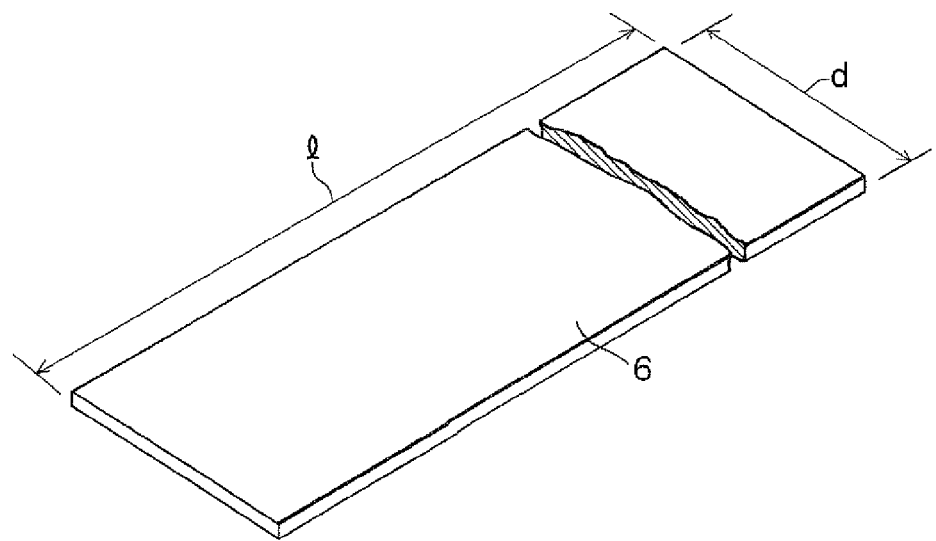
FIG. 9 is a perspective view of a heat-resistant material in the process of manufacturing the spherical annular seal member in accordance with the invention.

(Fifth Process) Another heat-resistant material 6, which is similar to the above-described heat-resistant material 6 and has a smaller width d than the width D of the reinforcing member 5 and has a length l of such an extent that the tubular base member 13 can be wound by one turn, is prepared separately, as shown in FIG. 9.

(Sixth Process) An aqueous dispersion is prepared in which an h-BN powder and a boron oxide powder are dispersedly contained in an alumina sol in which hydrated alumina is dispersedly contained in water serving as a dispersion medium containing nitric acid acting as a deflocculant, and which exhibits a hydrogen ion concentration (pH) of 2 to 3. This aqueous dispersion is one in which 30 to 50 wt. % of a lubricating composition containing 70 to 85 wt. % of the h-BN, 0.1 to 10 wt. % of boron oxide, and 5 to 20 wt. % of hydrated alumina is dispersedly contained as a solid content. Alternatively, this aqueous dispersion may be one in which, in a lubricating composition containing 70 to 85 wt. % of h-BN, 0.1 to 10 wt. % of boron oxide, and 5 to 20 wt. % of hydrated alumina, 30 to 50 wt. % of a lubricating composition containing PTFE powder at a rate of not more than 200 parts by weight, preferably 50 to 150 parts by weight, with respect to 100 parts by weight of that lubricating composition is dispersely contained as a solid content.

Figure 10:
FIG. 10 is a cross-sectional view of a heat-resistant material having a coating layer of a solid lubricant in the process of manufacturing the spherical annular seal member in accordance with the invention.

An aqueous dispersion (21 to 25.5 wt. % of h-BN, 0.03 to 3 wt. % of boron oxide, 1.5 to 6 wt. % of hydrated alumina, and 70 wt. % of water), in which 30 wt. % of a lubricating composition containing 70 to 85 wt. % of h-BN, 0.1 to 10 wt. % of boron nitride, and 5 to 20 wt. % of hydrated alumina is dispersedly contained as a solid content, is coated on one surface of the heat-resistant material 6 shown in FIG. 9 referred to above by means of brushing, roller coating, spraying, or the like. This coating is then dried to form a coating layer 14 of the solid lubricant constituted of that lubricating composition, as shown in FIG. 10.

Alternatively, an aqueous dispersion (7 to 17 wt. % of h-BN, 0.009 to 2 wt. % of boron oxide, 0.5 to 4 wt. % of hydrated alumina, 10 to 20 wt. % of PTFE, and 70 wt. % of water) is coated on one surface of the heat-resistant material 6 by means of brushing, roller coating, spraying, or the like. The aqueous dispersion is one in which, in a lubricating composition containing 70 to 85 wt. % of h-BN, 0.1 to 10 wt. % of boron oxide, and 5 to 20 wt. % of hydrated alumina, 30 wt. % of a lubricating composition containing PTFE powder at a rate of not more than 200 parts by weight, preferably 50 to 150 parts by weight, with respect to 100 parts by weight of that lubricating composition, i.e., a lubricating composition containing 23.3 to 56.7 wt. % of h-BN, 0.03 to 6.7 wt. % of boron oxide, 1.7 to 13.3 wt. % of hydrated alumina, and 33.3 to 66.7 wt. % of PTFE, is dispersedly contained as a solid content. The coating is then dried to form the coating layer 14 of the solid lubricant constituted of that lubricating composition.

(Seventh Process)

<First Method>

Figure 11:
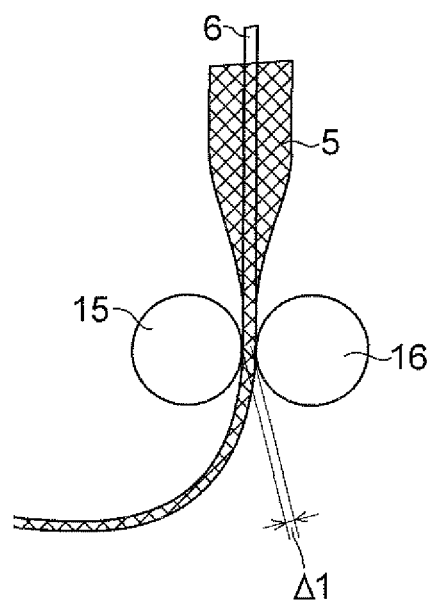
FIG. 11 is a diagram explaining a first method of forming an outer layer forming member in the process of manufacturing the spherical annular seal member in accordance with the invention.
Figure 12:
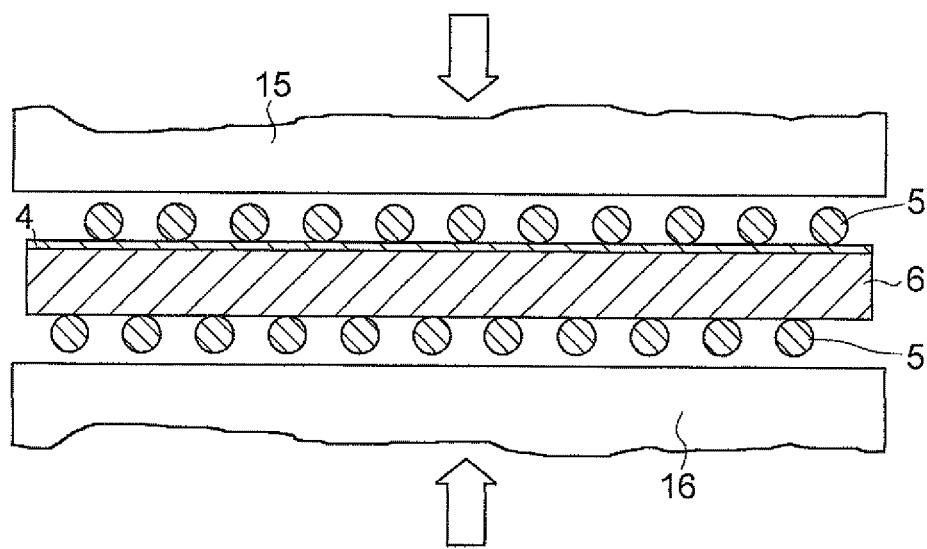
FIG. 12 is a diagram explaining the first method of forming the outer layer forming member in the process of manufacturing the spherical annular seal member in accordance with the invention.
Figure 13:
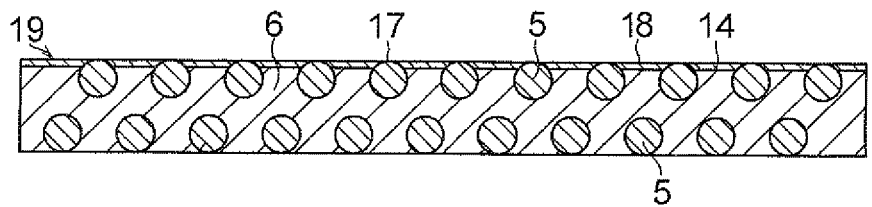
FIG. 13 is a vertical cross-sectional view of the outer layer forming member obtained by the first forming method in the process of manufacturing the spherical annular seal member in accordance with the invention.

As shown in FIGS. 11 to 13, the heat-resistant material 6 having the coating layer 14 of the solid lubricant is continuously inserted (see FIG. 11) into the reinforcing member 5 for the outer layer constituted by a cylindrical braided metal wire net obtained by continuously knitting fine metal wires with a wire diameter of 0.28 to 0.32 mm by a knitting machine (not shown). The reinforcing member 5 with the heat-resistant material 6 inserted therein, starting with its insertion-starting end side, is fed into a nip Δ1 between a pair of cylindrical rollers 15 and 16 having smooth cylindrical outer peripheral surfaces, and is thereby pressurized (see FIG. 12) in the thicknesswise direction of the heat-resistant material 6 so as to be formed integrally, such that the heat-resistant material 6 and the coating layer 14 of the solid lubricant formed on the obverse surface of the heat-resistant material 6 are filled in the meshes of the metal wire net of the reinforcing member 5 for the outer layer. Thus, a flat outer layer forming member 19, in which a surface 17 constituted by the reinforcing member 5 for the outer layer and a surface 18 constituted by the solid lubricant are exposed on its obverse surface in mixed form, is fabricated.

<Second Method>

Figure 14:
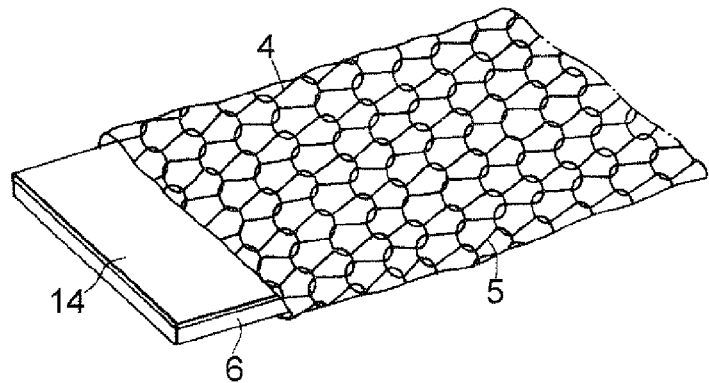
FIG. 14 is a diagram explaining a second method of forming the outer layer forming member in the process of manufacturing the spherical annular seal member in accordance with the invention.
Figure 15:
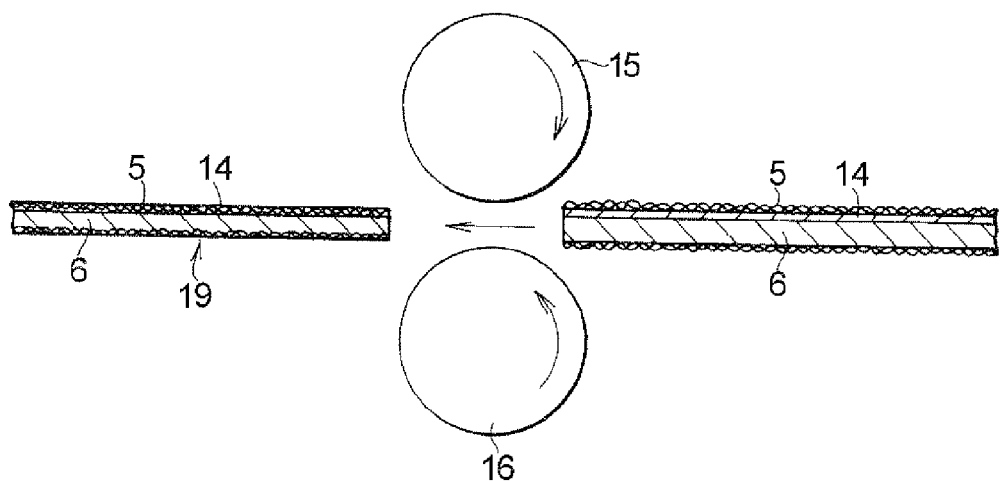
FIG. 15 is a diagram explaining the second method of forming the outer layer forming member in the process of manufacturing the spherical annular seal member in accordance with the invention.

A reinforcing member 5 constituted by the belt-shaped metal wire net 4, which has been described in the above-described first process, is prepared separately. The heat-resistant material 6 having the coating layer 14 of the solid lubricant is inserted into the reinforcing member 5 for the outer layer constituted by the belt-shaped metal wire net 4, as shown in FIG. 14. An assembly thereof is fed into the nip Δ1 between the rollers 15 and 16, as shown in FIG. 15, and is thereby pressurized in the thicknesswise direction of the heat-resistant material 6 so as to be formed integrally, such that the heat-resistant material 6 and the coating layer 14 of the solid lubricant formed on the obverse surface of the heat-resistant material 6 are filled in the meshes of the metal wire net of the reinforcing member 5 for the outer layer. Thus, the flat outer layer forming member 19, in which the surface 17 constituted by the reinforcing member 5 for the outer layer and the surface 18 constituted by the solid lubricant are exposed on its obverse surface in mixed form, is fabricated.

<Third Method>

A plain woven metal wire net is prepared as a woven metal wire net which is formed by weaving fine metal wires with a wire diameter of 0.28 to 0.32. The reinforcing member 5 for the outer layer constituted by this plain woven metal wire net is cut into a predetermined length and width, thereby preparing two reinforcing members 5. The heat-resistant material 6 having the coating layer 14 of the solid lubricant is inserted between the two reinforcing members 5 for the outer layer, and an assembly thereof is fed into the nip Δ1 between the pair of cylindrical rollers 15 and 16, and is thereby pressurized in the thicknesswise direction of the heat-resistant material 6 so as to be formed integrally, such that the heat-resistant material 6 and the coating layer 14 of the solid lubricant formed on the obverse surface of the heat-resistant material 6 are filled in the meshes of the metal wire net of the reinforcing member 5 for the outer layer. Thus, the flat outer layer forming member 19, in which the surface 17 constituted by the reinforcing member 5 for the outer layer and the surface 18 constituted by the solid lubricant are exposed on its obverse surface in mixed form, is fabricated.

In the above-described first, second, and third methods, 0.4 to 0.6 mm or thereabouts is appropriate as the nip Δ1 between the pair of cylindrical rollers 15 and 16.

Figure 16:
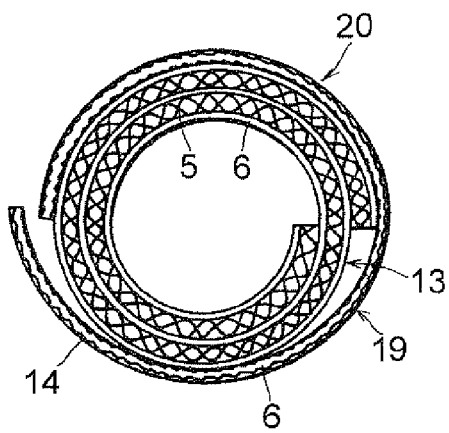
FIG. 16 is a plan view of a cylindrical preform in the process of manufacturing the spherical annular seal member in accordance with the invention.

(Eighth Process) The outer layer forming member 19 thus obtained is wound around the outer peripheral surface of the tubular base member 13 with the coating layer 14 placed on the outer side, thereby fabricating a cylindrical preform 20, as shown in FIG. 16.

Figure 17:
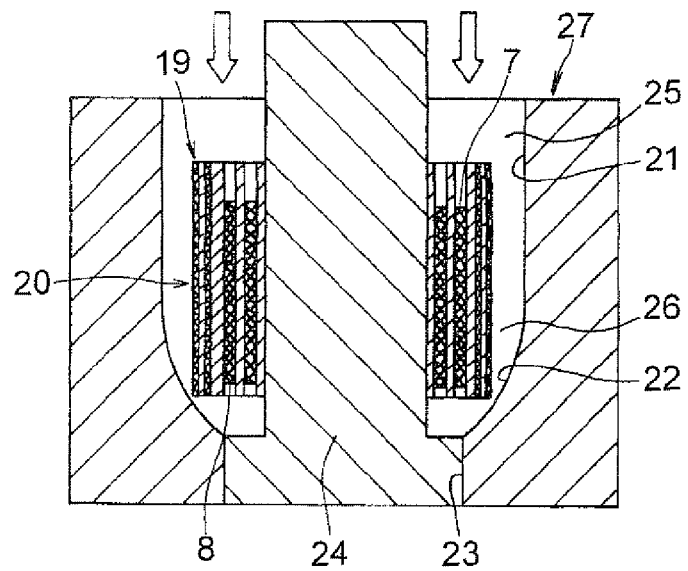
FIG. 17 is a vertical cross-sectional view illustrating a state in which the cylindrical preform is inserted in a die in the process of manufacturing the spherical annular seal member in accordance with the invention.

(Ninth Process) As shown in FIG. 17, a die 27 is prepared which has on its inner surface a cylindrical inner wall surface 21, a partially concave spherical inner wall surface 22 continuing from the cylindrical inner wall surface 21, and a through hole 23 continuing from the partially concave spherical inner wall surface 22, and in which a hollow cylindrical portion 25 and a spherical annular hollow portion 26 continuing from the hollow cylindrical portion 25 are formed as a stepped core 24 is inserted in the through hole 23. Then, the cylindrical preform 20 is fitted over the stepped core 24 of the die 27.

Figure 2:
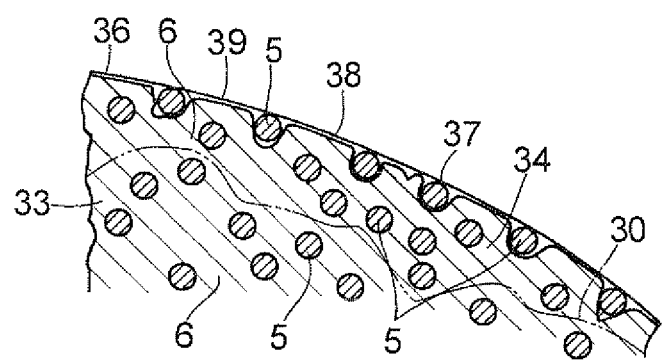
FIG. 2 is a partially enlarged explanatory view of the spherical annular seal member shown in FIG. 1.

The cylindrical preform 20 disposed in the hollow cylindrical portion 25 and the spherical annular hollow portion 26 of the die 27 is subjected to compression forming under a pressure of 98 to 294 N/mm² (1 to 3 tons/cm²) in the direction of the core axis. Thus, as shown in FIGS. 1 and 2, a spherical annular seal member 35 is fabricated which includes a spherical annular base member 33 having a through hole 28 in its central portion and defined by a cylindrical inner surface 29, the partially convex spherical surface 30, and the large- and small-diameter-side annular end faces 31 and 32 of the partially convex spherical surface 30, as well as an outer layer 34 formed integrally on the partially convex spherical surface 30 of the spherical annular base member 33.

Through this compression forming, the spherical annular base member 33 is constructed so as to be provided with structural integrity as the heat-resistant material 6 and the reinforcing member 5 are compressed and intertwined with each other. As for the outer layer 34, the heat-resistant material 6, the solid lubricant constituted of the lubricating composition, and the reinforcing member 5 made from the metal wire net are compressed, such that the solid lubricant and the heat-resistant material 6 are filled in the meshes of the metal wire net of the reinforcing member 5, and the solid lubricant, the heat-resistant material 6, and the reinforcing member 5 are integrally formed in mixed form. An outer surface 36 of that outer layer 34 is formed into a smooth surface 39 in which a surface 37 constituted by the reinforcing member 5 and a surface 38 constituted by the solid lubricant are present in mixed form.

In the spherical annular base member 33 and the outer layer 34 of the fabricated spherical annular seal member 35, the reinforcing member 5 made from the metal wire net is contained at a rate of 40 to 65 wt. %, and the solid lubricant and the heat-resistant material 6 containing expanded graphite are contained at a rate of 35 to 60 wt. %, and the heat-resistant material 6 and the solid lubricant in the spherical annular base member 33 and the outer layer 34 have a density of 1.20 to 2.00 Mg/m³.

In addition, if attention is focused on the outer layer 34 alone, the reinforcing member 5 made from the metal wire net is contained at a rate of 60 to 75 wt. %, and the solid lubricant and the heat-resistant material 6 containing expanded graphite are contained at a rate of 25 to 40 wt. %

In the above-described fourth step, if the tubular base member 13 is formed by spirally convoluting the superposed assembly 12 with the reinforcing member 5 made from the belt-shaped metal wire net 4 placed on the inner side instead of spirally convoluting it with the heat-resistant material 6 placed on the inner side, it is possible to fabricate the spherical annular seal member 35 in which the reinforcing member 5 made from the metal wire net is exposed on the cylindrical inner surface 29 of the spherical annular base member 33.

Figure 18:
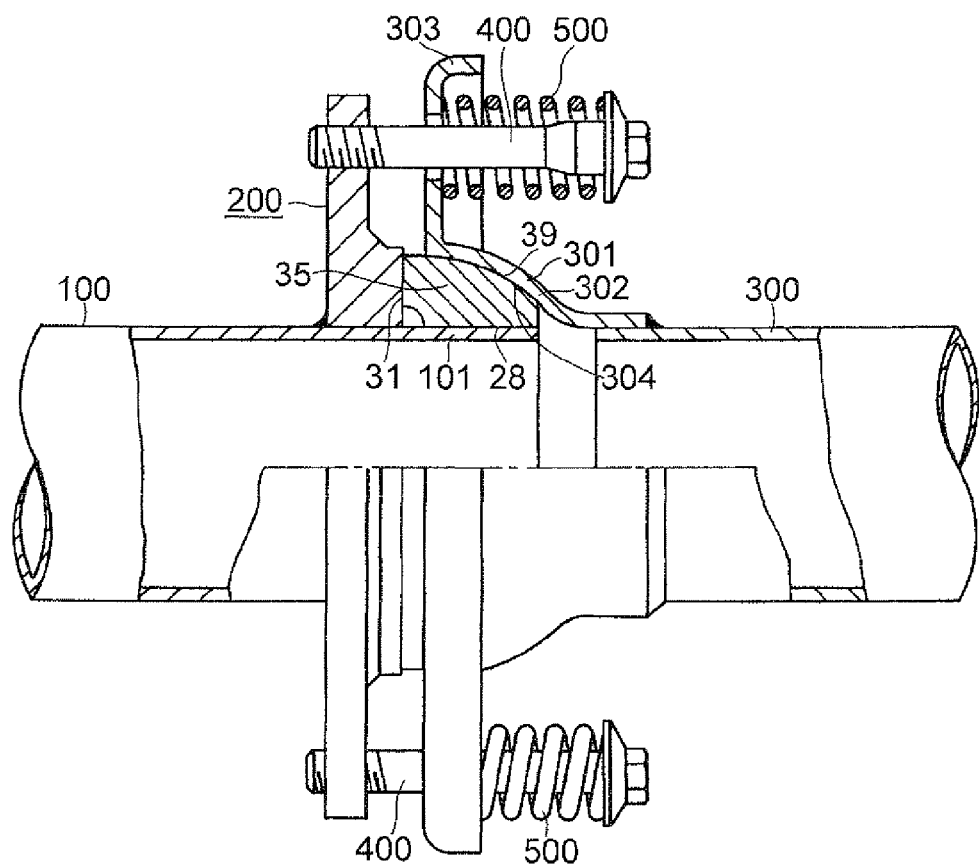
FIG. 18 is a vertical cross-sectional view of an exhaust pipe spherical joint with the spherical annular seal member in accordance with the invention incorporated therein.
Figure 19:
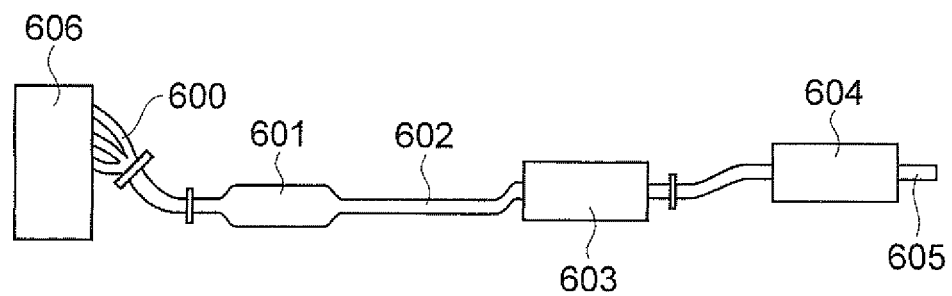
FIG. 19 is an explanatory diagram of an exhaust system of an engine.

The spherical annular seal member 35 is used by being incorporated in the exhaust pipe spherical joint shown in FIG. 18. That is, in the exhaust pipe spherical joint shown in FIG. 18, a flange 200 is provided uprightly on an outer peripheral surface of an upstream-side exhaust pipe 100, which is connected to an engine, by leaving a pipe end 101. The spherical annular seal member 35 is fitted over the pipe end 101 at the cylindrical inner surface 29 defining the through hole 28, and is seated with its large-diameter-side annular end face 31 abutting against the flange 200. A flared portion 301, which integrally has a concave spherical surface portion 302 and a flange portion 303 connected to the concave spherical surface portion 302, is secured to a downstream-side exhaust pipe 300 which is disposed in face-to-face relation to the upstream-side exhaust pipe 100 and is connected to a muffler side. An inner surface 304 of the concave spherical surface portion 302 is in slidable contact with the smooth surface 39 in which the surface 37 constituted by the reinforcing member 5 and the surface 38 constituted by the solid lubricant, both located in the outer surface 36 of the outer layer 34 of the spherical annular seal member 35 are present in mixed form.

In the exhaust pipe spherical joint shown in FIG. 18, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. The exhaust pipe spherical joint is arranged such that relative angular displacements occurring in the upstream- and downstream-side exhaust pipes 100 and 300 are allowed by sliding contact between the smooth surface 39 serving as a sliding surface of the outer layer 34 of the spherical annular seal member 35 and the inner surface 304 of the concave spherical surface portion 302 of the flared portion 301 formed at the end of the downstream-side exhaust pipe 300.

EXAMPLES

Example 1

By using one austenitic stainless steel wire (SUS 304) having a wire diameter of 0.28 mm as a fine metal wire, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet containing 4.0 wt. % of aluminum primary phosphate and having a density of 1.12 Mg/m$^3$ and a thickness of 0.4 mm was used. After the heat-resistant sheet member was spirally convoluted by a one-circumference portion, the reinforcing member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member in the widthwise direction.

By using one fine metal wire similar to the one described above, a cylindrical braided metal wire net whose mesh size was 3.5 mm (vertical) and 1.5 mm (horizontal) was fabricated, and was passed between the pair of rollers, thereby fabricating the belt-shaped metal wire net. This belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An alumina sol was prepared in which boehmite (alumina monohydrate: $Al_2O_3 \cdot H_2O$) as hydrated alumina was dispersedly contained in water serving as a dispersion medium containing nitric acid acting as a deflocculant, and which exhibited a hydrogen ion concentration (pH) of 2. An aqueous dispersion (24.9 wt. % of h-BN, 1.2 wt. % of boron oxide, 3.9 wt. % of boehmite, and 70 wt. % of water and nitric acid) was then prepared which was an aqueous dispersion with an h-BN powder and a boron oxide powder dispersedly contained in this alumina sol, and in which 30 wt. % of a lubricating composition containing 83 wt. % of h-BN powder, 4 wt. % of boron nitride powder, and 13 wt. % of boehmite was dispersedly contained as a solid content.

A coating operation in which the above-described aqueous dispersion was applied by brush coating to one surface of the aforementioned separately prepared heat-resistant material and was allowed to dry was repeated three times, to thereby form a coating layer (83 wt. % of h-BN, 4 wt. % of boron oxide, and 13 wt. % of boehmite) of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

This outer layer forming member was wound around the outer peripheral surface of the aforementioned tubular base member with the surface of the coating layer placed on the outer side, thereby preparing the cylindrical preform. This cylindrical preform was fitted over the stepped core of the die shown in FIG. 17, and was placed in the hollow portion of the die.

The cylindrical preform disposed in the hollow portion of the die was subjected to compression forming under a pressure of 294 N/mm$^2$ (3 tons/cm$^2$) in the direction of the core axis. Thus, a spherical annular seal member was obtained which included the spherical annular base member having the through hole in its central portion and defined by the cylindrical inner surface and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 83 wt. % of h-BN, 4 wt. % of boron oxide, and 13 wt. % of boehmite, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 51.5 wt. %, and the solid lubricant and the heat-resistant material containing expanded graphite were contained at a rate of 48.5 wt. %, and the densities of the heat-resistant material and the solid lubricant in the spherical annular base member and the outer layer were 1.60 Mg/m$^3$. In addition, in the outer layer, the reinforcing member for the outer layer made from the metal wire net was contained at a rate of 65.8 wt. %, and the solid lubricant and the heat-resistant material containing expanded graphite were contained at a rate of 34.2 wt. %.

Example 2

By using as fine metal wires two austenitic stainless steel wires which were similar to those of the above-described Example 1 and had a wire diameter of 0.28 mm, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet similar to that of the above-described Example 1 was used. After the heat-resistant sheet member was spirally convoluted by a one-circumference portion, the reinforcing member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member in the widthwise direction.

By using one fine metal wire similar to the one described above, a cylindrical braided metal wire net whose mesh size was 3.5 mm (vertical) and 2.5 mm (horizontal) was fabricated, and was passed between the pair of rollers, thereby fabricating the belt-shaped metal wire net. This belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An alumina sol was prepared in which boehmite (alumina monohydrate: $Al_2O_3 \cdot H_2O$) as hydrated alumina was dispersedly contained in water serving as a dispersion medium containing nitric acid acting as a deflocculant, and which exhibited a hydrogen ion concentration (pH) of 2. An aqueous dispersion (24.9 wt. % of h-BN, 1.2 wt. % of boron oxide, 3.9 wt. % of boehmite, and 70 wt. % of water and nitric acid) was then prepared which was an aqueous dispersion with an h-BN powder and a boron oxide powder dispersedly contained in this alumina sol, and in which 30 wt. % of a lubricating composition containing 83 wt. % of h-BN powder, 4 wt. % of boron nitride powder, and 13 wt. % of boehmite was dispersedly contained as a solid content. Additionally, an aqueous dispersion (60 wt. % of PTFE and 40 wt. % of water and a surface active agent) was prepared in which 60 wt. % of a PTFE powder was contained as a solid content. These aqueous dispersions were mixed to prepare an aqueous dispersion in which a lubricating composition containing 27.7 wt. % of h-BN, 66.7 wt. % of PTFE, 1.3 wt. % of boron oxide, and 4.3 wt. % of boehmite was dispersedly contained as a solid content.

The aqueous dispersion (13.9 wt % of h-BN, 33.3 wt. % of PTFE, 0.6 wt. % of boron oxide, 2.2 wt. % of boehmite, and 50 wt. % of water, nitric acid, and the surface active agent), in which 50 wt. % of a lubricating composition containing 27.7 wt. % of h-BN, 66.7 wt. % of PTFE, 1.3 wt. % of boron oxide, and 4.3 wt. % of boehmite was dispersedly contained as a solid content, was applied by brush coating to one surface of the aforementioned separately prepared heat-resistant material and was allowed to dry. This coating operation was repeated three times, to thereby form a coating layer (27.7 wt. % of h-BN, 66.7 wt. % of PTFE, 1.3 wt. % of boron oxide, and 4.3 wt. % of boehmite) of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 27.7 wt. % of h-BN, 66.7 wt. % of PTFE, 1.3 wt. % of boron oxide, and 4.3 wt. % of boehmite, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.3 wt. %, and the solid lubricant and the heat-resistant material containing expanded graphite were contained at a rate of 43.7 wt. %, and the densities of the heat-resistant material and the solid lubricant in the spherical annular base member and the outer layer were 1.72 $Mg/m^3$. In addition, in the outer layer, the reinforcing member for the outer layer made from the metal wire net was contained at a rate of 66.0 wt. %, and the solid lubricant and the heat-resistant material containing expanded graphite were contained at a rate of 34.0 wt. %.

Example 3

A tubular base member was fabricated by using materials and a method similar to those of the above-described Example 1. In this tubular base member, widthwise opposite end portions of the heat-resistant material respectively projected (jutted out) from the reinforcing member in the widthwise direction.

A belt-shaped metal wire net was fabricated in the same way as in the above-described Example 1, and this belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An alumina sol similar to that of the above-described Example 1 was prepared. An aqueous dispersion (41.5 wt. % of h-BN, 2 wt. % of boron oxide, 6.5 wt. % of boehmite, and 50 wt. % of water and nitric acid) was then prepared which was an aqueous dispersion with an h-BN powder and a boron oxide powder dispersedly contained in this alumina sol, and in which 50 wt. % of a lubricating composition containing 83 wt. % of h-BN powder, 4 wt. % of boron nitride powder, and 13 wt. % of boehmite was dispersedly contained as a solid content. Additionally, an aqueous dispersion (50 wt. % of PTFE and 50 wt. % of water and a surface active agent) was prepared in which 50 wt. % of a PTFE powder was contained as a solid content. These aqueous dispersions were mixed to prepare an aqueous dispersion in which a lubricating composition containing 41.5 wt. % of h-BN, 50.0 wt. % of PTFE, 2.0 wt. % of boron oxide, and 6.5 wt. % of boehmite was dispersedly contained as a solid content.

The aqueous dispersion (20.7 wt. % of h-BN, 25.0 wt. % of PTFE, 1.0 wt % of boron oxide, 3.3 wt. % of boehmite, and 50 wt. % of water, nitric acid, and the surface active agent), in which 50 wt. % of a lubricating composition containing 41.5 wt. % of h-BN, 50.0 wt. % of PTFE, 2.0 wt. % of boron oxide, and 6.5 wt. % of boehmite was dispersedly contained as a solid content, was applied by brush coating to one surface of the aforementioned separately prepared heat-resistant material and was allowed to dry. This coating operation was repeated three times, to thereby form a coating layer (41.5 wt. % of h-BN, 50.0 wt. % of PTFE, 2.0 wt. % of boron oxide, and 6.5 wt. % of boehmite) of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 41.5 wt. % of h-BN, 50.0 wt. % of PTFE, 2.0 wt. % of boron oxide, and 6.5 wt. % of boehmite, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.0 wt. %, and the solid lubricant and the heat-resistant material containing expanded graphite were contained at a rate of 44.0 wt. %, and the densities of the heat-resistant material and the solid lubricant in the spherical annular base member and the outer layer were 1.61 $Mg/m^3$. In addition, in the outer layer, the reinforcing member for the outer layer made from the metal wire net was contained at a rate of 64.0 wt. %, and the solid lubricant and the heat-resistant material containing expanded graphite were contained at a rate of 36.0 wt. %.

Example 4

A tubular base member was fabricated by using materials and a method similar to those of the above-described Example 1. In this tubular base member, widthwise opposite end portions of the heat-resistant material respectively projected (jutted out) from the reinforcing member in the widthwise direction.

A belt-shaped metal wire net was fabricated in the same way as in the above-described Example 1, and this belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An alumina sol similar to that of the above-described Example 1 was prepared. An aqueous dispersion (49.8 wt. % of h-BN, 2.4 wt. % of boron oxide, 7.8 wt. % of boehmite, and 40 wt. % of water and nitric acid) was then prepared which was an aqueous dispersion with an h-BN powder and a boron oxide powder dispersedly contained in this alumina sol, and in which 60 wt. % of a lubricating composition containing 83 wt. % of h-BN powder, 4 wt. % of boron nitride powder, and 13 wt. % of boehmite was dispersedly contained as a solid content. Additionally, an aqueous dispersion (30 wt. % of PTFE and 70 wt. % of water and a surface active agent) was prepared in which 30 wt. % of a PTFE powder was contained as a solid content. These aqueous dispersions were mixed to prepare an aqueous dispersion in which a lubricating composition containing 55.3 wt. % of h-BN, 33.3 wt. % of PTFE, 2.7 wt. % of boron oxide, and 8.7 wt. % of boehmite was dispersedly contained as a solid content.

The aqueous dispersion (27.6 wt. % of h-BN, 16.6 wt. % of PTFE, 1.4 wt. % of boron oxide, 4.4 wt. % of boehmite, and 50 wt. % of water, nitric acid, and the surface active agent), in which 50 wt. % of a lubricating composition containing 55.3 wt. % of h-BN, 33.3 wt. % of PTFE, 2.7 wt. % of boron oxide, and 8.7 wt. % of boehmite was dispersedly contained as a solid content, was applied by brush coating to one surface of the aforementioned separately prepared heat-resistant material and was allowed to dry. This coating operation was repeated three times, to thereby form a coating layer (55.3 wt. % of h-BN, 33.3 wt. % of PTFE, 2.7 wt. % of boron oxide, and 8.7 wt. % of boehmite) of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 55.3 wt. % of h-BN, 33.3 wt. % of PTFE, 2.7 wt. % of boron oxide, and 8.7 wt. % of boehmite, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.7 wt. %, and the solid lubricant and the heat-resistant material containing expanded graphite were contained at a rate of 43.3 wt. %, and the densities of the heat-resistant material and the solid lubricant in the spherical annular base member and the outer layer were 1.63 $Mg/m^3$. In addition, in the outer layer, the reinforcing member for the outer layer made from the metal wire net was contained at a rate of 65.1 wt. %, and the solid lubricant and the heat-resistant material containing expanded graphite were contained at a rate of 34.9 wt. %.

Example 5

In the same way as in the above-described Example 2, by using as fine metal wires two austenitic stainless steel wires having a wire diameter of 0.28 mm, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet similar to that of the above-described Example 1 was used. After the heat-resistant sheet member was spirally convoluted by a one-circumference portion, the reinforcing member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member in the widthwise direction.

By using one fine metal wire similar to the one described above, a cylindrical braided metal wire net whose mesh size was 3.5 mm (vertical) and 2.5 mm (horizontal) was fabricated, and was passed between the pair of rollers, thereby fabricating the belt-shaped metal wire net. This belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An alumina sol similar to that of the above-described Example 1 was prepared. An aqueous dispersion (33.2 wt. % of h-BN, 1.6 wt. % of boron oxide, 5.2 wt. % of boehmite, and 60 wt. % of water and nitric acid) was then prepared which was an aqueous dispersion with an h-BN powder and a boron oxide powder dispersedly contained in this alumina sol, and in which 40 wt. % of a lubricating composition containing 83 wt. % of h-BN powder, 4 wt. % of boron nitride powder, and 13 wt. % of boehmite was dispersedly contained as a solid content. Additionally, an aqueous dispersion (60 wt. % of PTFE and 40 wt. % of water and a surface active agent) was prepared in which 60 wt. % of a PTFE powder was contained as a solid content. These aqueous dispersions were mixed to prepare an aqueous dispersion in which a lubricating composition containing 33.2 wt. % of h-BN, 60 wt. % of PTFE, 1.6 wt. % of boron oxide, and 5.2 wt. % of boehmite was dispersedly contained as a solid content.

The aqueous dispersion (16.6 wt. % of h-BN, 30.0 wt. % of PTFE, 0.8 wt. % of boron oxide, 2.6 wt. % of boehmite, and 50 wt. % of water, nitric acid, and the surface active agent), in which 50 wt. % of a lubricating composition containing 33.2 wt. % of h-BN, 60 wt. % of PTFE, 1.6 wt. % of boron oxide, and 5.2 wt. % of boehmite was dispersedly contained as a solid content, was applied by brush coating to one surface of the aforementioned separately prepared heat-resistant material and was allowed to dry. This coating operation was repeated three times, to thereby form a coating layer (33.2 wt.

% of h-BN, 60 wt. % of PTFE, 1.6 wt. % of boron oxide, and 5.2 wt. % of boehmite) of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 33.2 wt. % of h-BN, 60 wt. % of PTFE, 1.6 wt. % of boron oxide, and 5.2 wt. % of boehmite, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 54.6 wt. %, and the solid lubricant and the heat-resistant material containing expanded graphite were contained at a rate of 45.4 wt. %, and the densities of the heat-resistant material and the solid lubricant in the spherical annular base member and the outer layer were 1.70 Mg/m$^3$. In addition, in the outer layer, the reinforcing member for the outer layer made from the metal wire net was contained at a rate of 64.2 wt. %, and the solid lubricant and the heat-resistant material containing expanded graphite were contained at a rate of 35.8 wt. %.

Example 6

By using two austenitic stainless steel wires (SUS 304) having a wire diameter of 0.28 mm as fine metal wires, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet having a density of 1.12 Mg/m$^3$ and a thickness of 0.4 mm was used. After the heat-resistant sheet member was spirally convoluted by a one-circumference portion, the reinforcing member for the spherical annular base member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member for the spherical annular base member in the widthwise direction.

A heat-resistant material similar to the above-described heat-resistant material was prepared separately.

An alumina sol was prepared in which boehmite (alumina monohydrate: Al$_2$O$_3$.H$_2$O) as hydrated alumina was dispersedly contained in water serving as a dispersion medium containing nitric acid acting as a deflocculant, and which exhibited a hydrogen ion concentration (pH) of 2. An aqueous dispersion A (24.9 wt. % of h-BN, 1.2 wt. % of boron oxide, 3.9 wt. % of boehmite, and 70 wt. % of water and nitric acid) was then prepared which was an aqueous dispersion with an h-BN powder and a boron oxide powder dispersedly contained in this alumina sol, and in which 30 wt. % of a lubricating composition containing 83 wt. % of h-BN, 4 wt. % of boron oxide, and 13 wt. % of boehmite was dispersedly contained as a solid content.

The above-described aqueous dispersion A was applied by brush coating to one surface of the aforementioned separately prepared heat-resistant material and was allowed to dry, to thereby form a coating layer (83 wt. % of h-BN, 4 wt. % of boron oxide, and 13 wt. % of boehmite) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

This outer layer forming member was wound around the outer peripheral surface of the aforementioned tubular base member with the coating layer placed on the outer side, thereby preparing the cylindrical preform. This cylindrical preform was fitted over the stepped core of the die shown in FIG. 17, and was placed in the hollow portion of the die.

The cylindrical preform disposed in the hollow portion of the die was subjected to compression forming under a pressure of 294 N/mm$^2$ (3 tons/cm$^2$) in the direction of the core axis. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 83 wt. % of h-BN, 4 wt. % of boron oxide, and 13 wt. % of boehmite, and the reinforcing member for the outer layer made from the metal wire net were compressed, such that the solid lubricant and the heat-resistant material were filled in the meshes of the metal wire net of the reinforcing member for the outer layer, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 57.6 wt. %, and the solid lubricant and the heat-resistant material containing expanded graphite were contained at a rate of 42.4 wt. %, and the densities of the heat-resistant material and the solid lubricant in the spherical annular base member and the outer layer were 1.60 Mg/m$^3$. In addition, in the outer layer, the reinforcing member for the outer layer made from the metal wire net was contained at a rate of 65.8 wt. %, and the solid lubricant and the heat-resistant material containing expanded graphite were contained at a rate of 34.2 wt. %.

Example 7

By using two austenitic stainless steel wires similar to those of the above-described Example 6, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. An expanded graphite sheet similar to that of the above-described Example 6 was used as the heat-resistant material. After the heat-resistant sheet member was spirally convoluted by a one-circumference portion, the reinforcing member for the spherical annular base member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member for the spherical annular base member in the widthwise direction.

A heat-resistant material similar to the above-described heat-resistant material was prepared separately.

An aqueous dispersion A similar to that of the above-described Example 6 and an aqueous dispersion B (60 wt. % of PTFE and 40 wt. % of water and a surface active agent) in which 60 wt. % of a PTFE powder was dispersedly contained as a solid content were prepared. These aqueous dispersions A and B were mixed at a ratio of A:B=70:30, to thereby prepare an aqueous dispersion C in which 39 wt. % of a lubricating composition containing 17.43 wt. % of h-BN, 0.84 wt. % of boron oxide, 2.73 wt. % of boehmite, and 18 wt. % of PTFE was dispersedly contained as a solid content.

The above-described aqueous dispersion C was applied by brush coating to one surface of the aforementioned separately prepared heat-resistant material and was allowed to dry, to thereby form a coating layer (44.7 wt. % of h-BN, 2.1 wt. % of boron oxide, 7 wt. % of boehmite, and 46.2 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 44.7 wt. % of h-BN, 2.1 wt. % of boron oxide, 7 wt. % of boehmite, and 46.2 wt. % of PTFE, and the reinforcing member for the outer layer made from the metal wire net were compressed, such that the solid lubricant and the heat-resistant material were filled in the meshes of the metal wire net of the reinforcing member for the outer layer, and the solid lubricant, the heat-resistant material, and the reinforcing member were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.9 wt. %, and the solid lubricant and the heat-resistant material containing expanded graphite were contained at a rate of 43.1 wt. %, and the densities of the heat-resistant material and the solid lubricant in the spherical annular base member and the outer layer were 1.62 Mg/m$^3$. In addition, in the outer layer, the reinforcing member for the outer layer made from the metal wire net was contained at a rate of 66.4 wt. %, and the solid lubricant and the heat-resistant material containing expanded graphite were contained at a rate of 33.6 wt. %.

Example 8

A tubular base member was fabricated by using component materials and a method similar to those of the above-described Example 6. In this tubular base member, widthwise opposite end portions of the heat-resistant material respectively projected (jutted out) from the reinforcing member for the spherical annular base member in the widthwise direction.

A heat-resistant material similar to the above-described heat-resistant material was prepared separately.

An aqueous dispersion A similar to that of the above-described Example 6 and an aqueous dispersion B similar to that of the above-described Example 7 were prepared. These aqueous dispersions A and B were mixed at a ratio of A:B=65.5:34.5, to thereby prepare an aqueous dispersion D in which 40.3 wt. % of a lubricating composition containing 16.3 wt. % of h-BN, 0.8 wt. % of boron oxide, 2.5 wt. % of boehmite, and 20.7 wt. % of PTFE was dispersedly contained as a solid content.

The above-described aqueous dispersion D was applied by brush coating to one surface of the aforementioned separately prepared heat-resistant material and was allowed to dry, to thereby form a coating layer (40.4 wt. % of h-BN, 2.0 wt. % of boron oxide, 6.2 wt. % of boehmite, and 51.4 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 turn (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer fanned integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 40.4 wt. % of h-BN, 2 wt. % of boron oxide, 6.2 wt. % of boehmite, and 51.4 wt. % of PTFE, and the reinforcing member for the outer layer made from the metal wire net were compressed, such that the solid lubricant and the heat-resistant material were filled in the meshes of the metal wire net of the reinforcing member for the outer layer, and the solid lubricant, the heat-resistant material, and the reinforcing member were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.7 wt. %, and the solid lubricant and the heat-resistant material containing expanded graphite were contained at a rate of 43.3 wt. %, and the densities of the heat-resistant material and the solid lubricant in the spherical annular base member and the outer layer were 1.61 Mg/m$^3$. In addition, in the outer layer, the reinforcing member for the outer layer made from the metal wire net was contained at a rate of 64.2 wt. %, and the solid lubricant and the heat-resistant material containing expanded graphite were contained at a rate of 35.8 wt. %.

Example 9

A tubular base member was fabricated by using component materials and a method similar to those of the above-described Example 6. In this tubular base member, widthwise opposite end portions of the heat-resistant material respectively projected (jutted out) from the reinforcing member for the spherical annular base member in the widthwise direction.

A heat-resistant material similar to the above-described heat-resistant material was prepared separately.

An aqueous dispersion A similar to that of the above-described Example 6 and an aqueous dispersion B similar to that of the above-described Example 7 were prepared. These aqueous dispersions A and B were mixed at a ratio of A:B=60:40, to thereby prepare an aqueous dispersion E in which 42 wt. % of a lubricating composition containing 14.94 wt. % of h-BN, 0.72 wt. % of boron oxide, 2.34 wt. % of boehmite, and 24 wt. % of PTFE was dispersedly contained as a solid content.

The above-described aqueous dispersion E was applied by brush coating to one surface of the aforementioned separately prepared heat-resistant material and was allowed to dry, to thereby form a coating layer (35.6 wt. % of h-BN, 1.7 wt. % of boron oxide, 5.6 wt. % of boehmite, and 57.1 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 35.6 wt. % of h-BN, 1.7 wt. % of boron oxide, 5.6 wt. % of boehmite, and 57.1 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.3 wt. %, and the solid lubricant and the heat-resistant material containing expanded graphite were contained at a rate of 43.7 wt. %, and the densities of the heat-resistant material and the solid lubricant in the spherical annular base member and the outer layer were 1.65 Mg/m$^3$. In addition, in the outer layer, the reinforcing member for the outer layer made from the metal wire net was contained at a rate of 64.9 wt. %, and the solid lubricant and the heat-resistant material containing expanded graphite were contained at a rate of 35.1 wt. %.

Example 10

A tubular base member was fabricated by using component materials and a method similar to those of the above-described Example 6. In this tubular base member, widthwise opposite end portions of the heat-resistant material respectively projected (jutted out) from the reinforcing member for the spherical annular base member in the widthwise direction.

A heat-resistant material similar to the above-described heat-resistant material was prepared separately.

An aqueous dispersion A similar to that of the above-described Example 6 and an aqueous dispersion B similar to that of the above-described Example 7 were prepared. These aqueous dispersions A and B were mixed at a ratio of A:B=50:50, to thereby prepare an aqueous dispersion F in which 45 wt. % of a lubricating composition containing 12.45 wt. % of h-BN, 0.6 wt. % of boron oxide, 1.95 wt. % of boehmite, and 30 wt. % of PTFE was dispersedly contained as a solid content.

The above-described aqueous dispersion F was applied by brush coating to one surface of the aforementioned separately prepared heat-resistant material and was allowed to dry, to thereby form a coating layer (27.7 wt. % of h-BN, 1.3 wt. % of boron oxide, 4.3 wt. % of boehmite, and 66.7 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 27.7 wt. % of h-BN, 1.3 wt. % of boron oxide, 4.3 wt. % of boehmite, and 66.7 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.5 wt. %, and the solid lubricant and the heat-resistant material containing expanded graphite were contained at a rate of 43.5 wt. %, and the densities of the heat-resistant material and the solid lubricant in the spherical annular base member and the outer layer were 1.64 Mg/m³. In addition, in the outer layer, the reinforcing member for the outer layer made from the metal wire net was contained at a rate of 64.3 wt. %, and the solid lubricant and the heat-resistant material containing expanded graphite were contained at a rate of 35.7 wt. %.

Example 11

A tubular base member was fabricated by using component materials and a method similar to those of the above-described Example 1. In this tubular base member, widthwise opposite end portions of the heat-resistant material respectively projected (jutted out) from the reinforcing member for the spherical annular base member in the widthwise direction.

A heat-resistant material similar to the heat-resistant material used in the above-described Example 1 was prepared separately.

An aqueous dispersion D similar to the aqueous dispersion D used in the above-described Example 8 was prepared, and this aqueous dispersion D was applied by brush coating to one surface of the aforementioned separately prepared heat-resistant material and was allowed to dry, to thereby form a coating layer (40.4 wt. % of h-BN, 2 wt. % of boron oxide, 6.2 wt. % of boehmite, and 51.4 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 40.4 wt. % of h-BN, 2.0 wt. % of boron oxide, 6.2 wt. % of boehmite, and 51.4 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.5 wt. %, and the solid lubricant and the heat-resistant material containing expanded graphite were contained at a rate of 43.5 wt. %, and the densities of the heat-resistant material and the solid lubricant in the spherical annular base member and the outer layer were 1.63 Mg/m$^3$. In addition, in the outer layer, the reinforcing member for the outer layer made from the metal wire net was contained at a rate of 64.1 wt. %, and the solid lubricant and the heat-resistant material containing expanded graphite were contained at a rate of 35.9 wt. %.

Example 12

By using two austenitic stainless steel wires similar to those of the above-described Example 6, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. An expanded graphite sheet containing 0.7 wt. % of phosphorus pentoxide, 4.0 wt. % of aluminum primary phosphate, and expanded graphite, and having a density of 1.12 Mg/m$^3$ and a thickness of 0.4 mm was used as the heat-resistant material. After the heat-resistant sheet member was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member for the spherical annular base member in the widthwise direction.

A heat-resistant material (containing 0.7 wt. % of phosphorus pentoxide, 4.0 wt. % of aluminum primary phosphate, and expanded graphite, and having a density of 1.12 Mg/m$^3$ and a thickness of 0.4 mm) similar to the above-described heat-resistant material was prepared separately.

An aqueous dispersion D similar to the aqueous dispersion D used in the above-described Example 8 was prepared, and this aqueous dispersion D was applied by brush coating to one surface of the aforementioned separately prepared heat-resistant material and was allowed to dry, to thereby form a coating layer (40.4 wt. % of h-BN, 2 wt. % of boron oxide, 6.2 wt. % of boehmite, and 51.4 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip Δ1 (the nip Δ1 was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant fowled on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 40.4 wt. % of h-BN, 2 wt. % of boron oxide, 6.2 wt. % of boehmite, and 51.4 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.2 wt. %, and the solid lubricant and the heat-resistant material containing expanded graphite were contained at a rate of 43.8 wt. %, and the densities of the heat-resistant material and the solid lubricant in the spherical annular base member and the outer layer were 1.65 Mg/m$^3$. In addition, in the outer layer, the reinforcing member for the outer layer made from the metal wire net was contained at a rate of 63.6 wt. %, and the solid lubricant and the heat-resistant material containing expanded graphite were contained at a rate of 36.4 wt. %.

Example 13

A tubular base member was fabricated by using component materials and a method similar to those of the above-described Example 12. In this tubular base member, widthwise opposite end portions of the heat-resistant material respectively projected (jutted out) from the reinforcing member for the spherical annular base member in the widthwise direction.

A heat-resistant material similar to the heat-resistant material of the above-described Example 12 was prepared separately.

An aqueous dispersion F similar to the aqueous dispersion F used in the above-described Example 10 was prepared, and this aqueous dispersion F was applied by brush coating to one surface of the aforementioned separately prepared heat-resistant material and was allowed to dry, to thereby form a coating layer (27.7 wt. % of h-BN, 1.3 wt. % of boron oxide, 4.3 wt. % of boehmite, and 66.7 wt. % of PTFE) of the solid lubricant constituted of that lubricating composition.

By using as a reinforcing member for the outer layer one fine metal wire similar to that of the reinforcing member for the spherical annular base member, a cylindrical braided metal wire net whose mesh size was 3.5 mm (vertical) and 2.5 mm (horizontal) was continuously woven, and the heat-resistant material having the coating layer of the solid lubricant was inserted into the inner side of the cylindrical braided metal wire net. The reinforcing member for the outer layer with the heat-resistant material inserted therein, starting with its insertion-starting end side, was fed into a nip $\Delta 1$ (the nip $\Delta 1$ was set to 0.5 mm) between a pair of cylindrical rollers having smooth cylindrical outer peripheral surfaces, and was thereby pressurized in the thicknesswise direction of the heat-resistant material so as to be formed integrally, such that the heat-resistant material and the coating layer of the solid lubricant formed on the obverse surface of the heat-resistant material were filled in the meshes of the metal wire net of the reinforcing member for the outer layer. Thus, the flat outer layer forming member, in which the surface constituted by the reinforcing member for the outer layer and the surface constituted by the solid lubricant were exposed on its obverse surface in mixed form, was fabricated.

Thereafter, compression forming was carried out in the same way as in the above-described Example 6. Thus, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 27.7 wt. % of h-BN, 1.3 wt. % of boron oxide, 4.3 wt. % of boehmite, and 66.7 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member for the outer layer were integrally formed in mixed form. The outer surface of that outer layer was formed into a smooth surface in which the surface constituted by the reinforcing member for the outer layer and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 56.5 wt. %, and the solid lubricant and the heat-resistant material containing expanded graphite were contained at a rate of 43.5 wt. %, and the densities of the heat-resistant material and the solid lubricant in the spherical annular base member and the outer layer were 1.66 Mg/m³. In addition, in the outer layer, the reinforcing member for the outer layer made from the metal wire net was contained at a rate of 64.2 wt. %, and the solid lubricant and the heat-resistant material containing expanded graphite were contained at a rate of 35.8 wt. %.

Comparative Example 1

By using two austenitic stainless steel wires (SUS 304) which were similar to those of the above-described Example 1 and had a wire diameter of 0.28 mm, a cylindrical braided metal wire net whose mesh size was 3 mm (vertical) and 3 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet similar to that of the above-described Example 1 was used. After the heat-resistant sheet member was spirally convoluted by a one-circumference portion, the reinforcing member was superposed on the inner side of the heat-resistant material, and the superposed assembly thereof was spirally convoluted, thereby preparing the tubular base member in which the heat-resistant material was exposed on the outermost periphery. In this tubular base member, widthwise opposite end portions of the heat-resistant material respectively projected (jutted out) from the reinforcing member in the widthwise direction.

By using one fine metal wire similar to the one described above, a cylindrical braided metal wire net whose mesh size was 3.5 mm (vertical) and 2.5 mm (horizontal) was fabricated, and was passed between the pair of rollers, thereby fabricating the belt-shaped metal wire net. This belt-shaped metal wire net was used as the reinforcing member for the outer layer.

By using a heat-resistant material similar to the above-described heat-resistant material, a heat-resistant material having a smaller width than the width of the above-described reinforcing member for the outer layer was prepared separately.

An aqueous dispersion (25.5 wt. % of h-BN, 4.5 wt. % of alumina, and 70 wt. % of water), in which 30 wt. % of a lubricating composition constituted of 85 wt. % of h-BN and 15 wt. % of alumina was dispersedly contained as a solid content, was applied by brush coating to one surface of the aforementioned separately prepared heat-resistant material and was allowed to dry. This coating operation was repeated three times, to thereby form a coating layer of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, compression forming was carried out in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 85 wt. % of h-BN and 15 wt. % of alumina, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 53.8 wt. %, and the solid lubricant and the heat-resistant material containing expanded graphite were contained at a rate of 46.2 wt. %, and the densities of the heat-resistant material and the solid lubricant in the spherical annular base member and the outer layer were 1.58 $Mg/m^3$. In addition, in the outer layer, the reinforcing member for the outer layer made from the metal wire net was contained at a rate of 63.8 wt. %, and the solid lubricant and the heat-resistant material containing expanded graphite were contained at a rate of 36.2 wt. %.

Comparative Example 2

A tubular base member was fabricated by using materials and a method similar to those of the above-described Example 1. In this tubular base member, widthwise opposite end portions of the heat-resistant material respectively projected (jutted out) from the reinforcing member in the widthwise direction.

A belt-shaped metal wire net was fabricated in the same way as in the above-described Example 1, and this belt-shaped metal wire net was used as the reinforcing member for the outer layer.

By using a heat-resistant material similar to the above-described heat-resistant material, a heat-resistant material having a smaller width than the width of the belt-shaped metal wire net of the reinforcing member for the outer layer was prepared separately.

An aqueous dispersion (10.2 wt. % of h-BN, 1.8 wt % of alumina, 18 wt. % of PTFE, and 30 wt. % of water), in which a lubricating composition constituted of 85 wt. % of h-BN and 15 wt. % of alumina was set as 100 parts by weight, and 30 wt. % of a lubricating composition (34 wt. % of h-BN, 6 wt. % of alumina, 60 wt. % of PTFE) with 150 parts by weight of PTFE dispersedly contained in that lubricating composition was dispersedly contained as a solid content, was applied by brush coating to one surface of the aforementioned separately prepared heat-resistant material and was allowed to dry. This coating operation was repeated three times, to thereby form a coating layer of the solid lubricant constituted of that lubricating composition.

The heat-resistant material having the coating layer of the solid lubricant was inserted into the belt-shaped metal wire net, i.e., the reinforcing member for the outer layer, and an assembly thereof was passed between the pair of rollers so as to be formed integrally, such that the heat-resistant material and the coating layer of the solid lubricant formed on the obverse surface of the heat-resistant material were filled in the meshes of the metal wire net of the reinforcing member. Thus, the flat outer layer forming member, in which the surface constituted by the reinforcing member and the surface constituted by the solid lubricant were exposed on its obverse surface in mixed form, was fabricated.

Thereafter, compression forming was carried out in the same way as in the above-described Example 1, a spherical annular seal member was obtained which included the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material and the reinforcing member for the spherical annular base member made from the metal wire net were compressed and intertwined with each other. The spherical annular base member thus had the reinforcing member for the spherical annular base member made from the compressed metal wire net as well as the heat-resistant material which was constituted by expanded graphite and which filled the meshes of this reinforcing member and was compressed in such a manner as to be formed integrally with this reinforcing member in mixed form. As for the outer layer, the heat-resistant material, the solid lubricant constituted of the lubricating composition containing 34 wt. % of h-BN, 6 wt. % of alumina, and 60 wt. % of PTFE, and the reinforcing member for the outer layer made from the metal wire net were compressed, such that the solid lubricant and the heat-resistant material were filled in the meshes of the metal wire net of the reinforcing member, and the solid lubricant, the heat-resistant material, and the reinforcing member were integrally formed in mixed form. The outer surface of that outer layer was formed into a smooth surface in which the surface constituted by the reinforcing member and the surface constituted by the solid lubricant were present in mixed form.

In the spherical annular base member and the outer layer of the fabricated spherical annular seal member, the reinforcing members for the spherical annular base member and the outer layer made from the metal wire nets were contained at a rate of 54.0 wt. %, and the solid lubricant and the heat-resistant material containing expanded graphite were contained at a rate of 46.0 wt. %, and the densities of the heat-resistant material and the solid lubricant in the spherical annular base member and the outer layer were 1.62 Mg/m³. In addition, in the outer layer, the reinforcing member for the outer layer made from the metal wire net was contained at a rate of 63.5 wt. %, and the solid lubricant and the heat-resistant material containing expanded graphite were contained at a rate of 36.5 wt. %.

Then, the spherical annular seal members obtained in the above-described Examples 1 to 13 and Comparative Examples 1 and 2 were built in an exhaust pipe spherical joint shown in FIG. 18, tests were conducted on the amount of gas leakage (l/min) and the presence or absence of the occurrence of abnormal frictional noise, and their results are discussed below.

<Test Conditions Concerning Gas Leakage Amount>
  Pressing force using coil springs (spring set force): 980 N
  Angle of oscillation: ±2.5°
  Vibrational frequency (oscillating speed): 5 Hz
  Temperature (the outer surface temperature of the concave spherical surface portion 302 shown in FIG. 18): room temperature (25° C.) to 500° C.
  No. of oscillations: 1,000,000 oscillations
  Mating member (material of the flared portion 301 shown in FIG. 18): SUS 304

<Test Method>
While the oscillating motion at ±2.5° was being continued at a vibrational frequency of 5 Hz at room temperature (25° C.), the temperature was raised to 500° C. The oscillating motion was continued in a state in which that temperature was maintained, and the amount of gas leakage was measured at the point of time when the number of oscillations reached 1,000,000.

<Method of Measuring Gas Leakage Amount>
An opening of one exhaust pipe 100 connected to the exhaust pipe joint shown, in FIG. 18 was closed, dry air was allowed to flow in from the other exhaust pipe 300 side under a pressure of 0.049 MPa (0.5 kgf/cm²), and the amount of leakage from the joint portion (sliding contact portions between the surface 39 of the spherical annular seal member 35 and the flared portion 301, fitting portions between the cylindrical inner surface 29 of the spherical annular seal member 35 and the pipe end portion 101 of the exhaust pipe 100, and abutting portions between the annular end face 31 and the flange 200 provided uprightly on the exhaust pipe 100) was measured four times, i.e., (1) during an initial period of the test, (2) after 250,000 oscillating motions, (3) after 500,000 oscillating motions, and (4) after 1,000,000 oscillating motions, by means of a flowmeter.

<Test Conditions Concerning Presence or Absence of Abnormal Frictional Noise>
  Pressing force using coil springs (spring set force): 590 N
  Angle of oscillation: ±4°
  Vibrational frequency: 12 Hz
  Temperature (the outer surface temperature of the concave spherical surface portion 302 shown in FIG. 18): room temperature (25° C.) to 500° C.
  No. of oscillations: 1,000,000 cycles
  Mating member (material of the flared portion 301 shown in FIG. 18): SUS 304

<Test Method>
After 45,000 oscillating motions are performed at room temperature (25° C.) by setting an oscillating motion at ±4° at a vibrational frequency of 12 Hz as a unit of oscillation, the ambient temperature is raised to 500° C. while continuing the oscillating motions (the number of oscillating motions during the temperature rise being 45,000). When the ambient temperature reached 500° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

The evaluation of the presence or absence of the occurrence of abnormal frictional noise was conducted at the aforementioned points in time, i.e., (1) 250,000 oscillating motions, (2) 500,000 oscillating motions, (3) 750,000 oscillating motions, and (4) after 1,000,000 oscillating motions, as follows.

Evaluation Code A: No abnormal frictional noise occurred.
Evaluation Code B: Abnormal frictional noise is slightly heard with the ear brought close to the test piece.
Evaluation Code C: Although the noise is generally difficult to discern from a fixed position (a position 1.5 m distant from the test piece) since it is blanketed by the noises of the living environment, the noise can be discerned as abnormal frictional noise by a person engaged in the test.
Evaluation Code D: The noise can be recognized as abnormal frictional noise (unpleasant sound) by anybody from the fixed position.

Tables 1, 2, 3, and 4 show the results of the above-described tests.

TABLE 1

|  | Examples | | | |
| --- | --- | --- | --- | --- |
|  | 1 | 2 | 3 | 4 |
| <Heat-resistant Material (Expanded graphite)> | | | | |
| Aluminum primary phosphate | 4.0 | 4.0 | 4.0 | 4.0 |
| Phosphorus pentoxide | — | — | — | — |
| <Solid Lubricant> | | | | |
| h-BN | 83 | 27.7 | 41.5 | 55.3 |
| Boron oxide | 4 | 1.3 | 2.0 | 2.7 |
| Hydrated alumina | 13 | 4.3 | 6.5 | 8.7 |
| PTFE | — | 66.7 | 50.0 | 33.3 |
| Amount of Gas Leakage (l/min) | | | | |
| (1) | 0.05 | 0.05 | 0.05 | 0.06 |
| (2) | 0.14 | 0.08 | 0.10 | 0.12 |
| (3) | 0.24 | 0.16 | 0.20 | 0.22 |
| (4) | 0.42 | 0.30 | 0.36 | 0.42 |
| Determination of Abnormal Frictional Noise | | | | |
| (1) | A | A | A | A |
| (2) | A | A | A | A |
| (3) | A | A | A | A |
| (4) | A | A | A | A |

TABLE 2

|  | Examples | | | |
| --- | --- | --- | --- | --- |
|  | 5 | 6 | 7 | 8 |
| <Heat-resistant Material (Expanded graphite)> | | | | |
| Aluminum primary phosphate | 4.0 | — | — | — |
| Phosphorus pentoxide | — | — | — | — |

TABLE 2-continued

|  | Examples | | | |
| --- | --- | --- | --- | --- |
|  | 5 | 6 | 7 | 8 |
| <Solid Lubricant> | | | | |
| h-BN | 33.2 | 83 | 44.7 | 40.4 |
| Boron oxide | 1.6 | 4 | 2.1 | 2 |
| Hydrated alumina | 5.2 | 13 | 7 | 6.2 |
| PTFE | 60 | — | 46.2 | 51.4 |
| Amount of Gas Leakage (l/min) | | | | |
| (1) | 0.05 | 0.05 | 0.05 | 0.04 |
| (2) | 0.09 | 0.12 | 0.13 | 0.15 |
| (3) | 0.11 | 0.28 | 0.26 | 0.24 |
| (4) | 0.28 | 0.50 | 0.48 | 0.45 |
| Determination of Abnormal Frictional Noise | | | | |
| (1) | A | A | A | A |
| (2) | A | A | A | A |
| (3) | A | A | A | A |
| (4) | A | A | A | A |

TABLE 3

|  | Examples | | | |
| --- | --- | --- | --- | --- |
|  | 9 | 10 | 11 | 12 |
| <Heat-resistant Material (Expanded graphite)> | | | | |
| Aluminum primary phosphate | — | — | 4.0 | 4.0 |
| Phosphorus pentoxide | — | — | — | 0.7 |
| <Solid Lubricant> | | | | |
| h-BN | 35.6 | 27.7 | 40.4 | 40.4 |
| Boron oxide | 1.7 | 1.3 | 2 | 2 |
| Hydrated alumina | 5.6 | 4.3 | 6.2 | 6.2 |
| PTFE | 57.1 | 66.7 | 51.4 | 51.4 |
| Amount of Gas Leakage (l/min) | | | | |
| (1) | 0.04 | 0.03 | 0.05 | 0.03 |
| (2) | 0.16 | 0.16 | 0.12 | 0.10 |
| (3) | 0.22 | 0.20 | 0.20 | 0.14 |
| (4) | 0.42 | 0.46 | 0.36 | 0.28 |
| Determination of Abnormal Frictional Noise | | | | |
| (1) | A | A | A | A |
| (2) | A | A | A | A |
| (3) | A | A | A | A |
| (4) | A | A | A | A |

TABLE 4

|  | Example | Comparative Examples | |
| --- | --- | --- | --- |
|  | 13 | 1 | 2 |
| <Heat-resistant Material (Expanded graphite)> | | | |
| Aluminum primary phosphate | 4.0 | — | — |
| Phosphorus pentoxide | 0.7 | — | — |
| <Solid Lubricant> | | | |
| h-BN | 27.7 | 85 | 34 |
| Boron oxide | 1.3 | — | — |
| Hydrated alumina | 4.3 | — | — |
| PTFE | 66.7 | — | 60 |
| Alumina | — | 15 | 6 |
| Amount of Gas Leakage (l/min) | | | |
| (1) | 0.04 | 0.05 | 0.06 |
| (2) | 0.11 | 0.15 | 0.18 |
| (3) | 0.15 | 0.28 | 0.23 |
| (4) | 0.26 | 0.86 | 0.76 |
| Determination of Abnormal Frictional Noise | | | |
| (1) | A | A | A |
| (2) | A | B | A |
| (3) | A | B | B |
| (4) | A | B | B |

From the test results shown in Tables 1 to 4, it can be appreciated that the spherical annular seal members in accordance with Examples 1 to 13 excel over the spherical annular seal members in accordance with Comparative Examples 1 and 2 in the evaluation of the amount of gas leakage and abnormal frictional noise. If a comparison is made between the Examples 1 to 13 and the Comparative Examples 1 and 2, nearly two-fold improvement of performance was noted in the amount of gas leakage in the cases of the spherical annular seal members in accordance with Examples 1 to 13. Meanwhile, in the cases of the spherical annular seal members in accordance with Comparative Examples 1 and 2, it is conjectured that the generation of abnormal frictional noise occurred due to the fact that the solid lubricants in their outer layers dropped off or exfoliated in relatively early stages in sliding with mating members, and therefore a shift took place to sliding with reinforcing members made from metal wire nets in the outer layers. In the cases of the spherical annular seal members in accordance with the Examples 1 to 5 and the Examples 11 to 13, the heat-resistant material was composed of expanded graphite containing aluminum primary phosphate or aluminum primary phosphate and phosphorus pentoxide, and the resistance to oxidation of the expanded graphite was improved by phosphorus pentoxide and aluminum primary phosphate, so that the amount of gas leakage showed low values.

As described above, the spherical annular seal member in accordance with the invention is capable of eliminating as much as possible the leakage of exhaust gases through the seal member itself, permits the formation of a firm coating layer on the obverse surface of the heat-resistant material by improving the adherence of the solid lubricant onto the obverse surface of the heat-resistant material, is capable of eliminating the generation of abnormal frictional noise in the sliding with a mating member, and exhibits stable sealing characteristics.

The invention claimed is:

1. A spherical annular seal member for use in an exhaust pipe joint, comprising: a spherical annular base member defined by a cylindrical inner surface, a partially convex spherical surface, and large- and small-diameter-side annular end faces of the partially convex spherical surface; and an outer layer formed integrally on the partially convex spherical surface of said spherical annular base member, wherein said spherical annular base member includes a reinforcing member made from a metal wire net and a heat-resistant material containing expanded graphite, filling meshes of said reinforcing member, and compressed in such a manner as to be formed integrally with said reinforcing member in mixed form, and wherein, in said outer layer, a heat-resistant material containing expanded graphite, a solid lubricant constituted of a lubricating composition containing at least 70 to 85 wt. % of hexagonal boron nitride, 0.1 to 10 wt. % of boron oxide, and 5 to 20 wt. % of hydrated alumina, and a reinforcing member made from a metal wire net are compressed such that said solid lubricant and said heat-resistant material are filled in meshes of said metal wire net of said reinforcing member, and said solid lubricant, said heat-resistant material, and said reinforcing member are integrally formed in mixed form, an outer surface of said outer layer being formed into a smooth surface in which a surface constituted of said reinforcing member and a surface constituted of said solid lubricant are present in mixed form.

2. The spherical annular seal member according to claim 1, wherein said lubricating composition is formed such that, in a lubricating composition containing 70 to 85 wt. % of hexagonal boron nitride, 0.1 to 10 wt. % of boron oxide, and 5 to 20 wt. % of hydrated alumina, polytetrafluoroethylene resin is contained at a rate of not more than 200 parts by weight with respect to 100 parts by weight of that lubricating composition.

3. The spherical annular seal member according to claim 1, wherein said lubricating composition is formed such that, in a lubricating composition containing 70 to 85 wt. % of hexagonal boron nitride, 0.1 to 10 wt. % of boron oxide, and 5 to 20 wt. % of hydrated alumina, polytetrafluoroethylene resin is contained at a rate of 50 to 150 parts by weight with respect to 100 parts by weight of that lubricating composition.

4. The spherical annular seal member according to claim 1, wherein hydrated alumina is selected from alumina monohydrate, alumina trihydrate, and pseudoboehmite.

5. The spherical annular seal member according to claim 1, in said spherical annular base member and said outer layer, said reinforcing member made from said metal wire net is contained at a rate of 40 to 65 wt. %, said lubricating composition and said heat-resistant material containing expanded graphite are contained at a rate of 35 to 60 wt. %, and said heat-resistant material and said solid lubricant in said spherical annular base member and said outer layer have a density of 1.20 to 2.00 Mg/m$^3$.

6. The spherical annular seal member according to claim 1, wherein, in said outer layer, said reinforcing member made from said metal wire net is contained at a rate of 60 to 75 wt. %, and said solid lubricant and said heat-resistant material containing expanded graphite are contained at a rate of 25 to 40 wt. %.

7. The spherical annular seal member according to claim 1, wherein said heat-resistant material contains expanded graphite and at least one of 0.05 to 5.0 wt. % of phosphorus pentoxide and 1.0 to 16.0 wt. % of a phosphate.

8. A method of manufacturing a spherical annular seal member which is used in an exhaust pipe joint and includes a spherical annular base member defined by a cylindrical inner surface, a partially convex spherical surface, and large- and small-diameter-side annular end faces of the partially convex spherical surface, and an outer layer formed integrally on the partially convex spherical surface of said spherical annular base member, comprising the steps of:

(a) preparing a heat-resistant sheet member composed of expanded graphite;
(b) preparing a reinforcing member made from a metal wire net obtained by weaving or knitting fine metal wires, superposing said reinforcing member on said heat-resistant sheet member to form a superposed assembly, and convoluting the superposed assembly into a cylindrical form, so as to form a tubular base member;
(c) preparing an aqueous dispersion formed by dispersedly containing at least a hexagonal boron nitride powder and a boron oxide powder in an alumina sol in which hydrated alumina particles are dispersed in water containing an acid as a dispersion medium, and which exhibits a hydrogen ion concentration of 2 to 3, said aqueous dispersion containing as a solid content a lubricating composition containing at least 70 to 85 wt. % of the hexagonal boron nitride, 0.1 to 10 wt. % of boron oxide, and 5 to 20 wt. % of hydrated alumina;
(d) preparing another heat-resistant sheet member, coating one surface of said another heat-resistant sheet member with said aqueous dispersion, and drying the same, so as to form on the surface of said heat-resistant sheet member a coating layer of a solid lubricant constituted of a lubricating composition containing at least 70 to 85 wt % of hexagonal boron nitride, 0.1 to 10 wt. % of boron oxide, and 5 to 20 wt. % of hydrated alumina;
(e) inserting said heat-resistant sheet member with said coating layer formed thereon between two layers constituted of a metal wire net of another reinforcing member made from said metal wire net obtained by weaving or knitting a fine metal wire, causing said reinforcing member with said heat-resistant sheet member inserted between the layers constituted of said metal wire net to be fed into a nip between a pair of cylindrical rollers and to be pressurized, such that said heat-resistant sheet member and said coating layer of said solid lubricant formed on an obverse surface of said heat-resistant sheet member are filled in meshes of said metal wire net of said reinforcing member, thereby forming a flat outer layer forming member in which a surface constituted of said reinforcing member and a surface constituted of said coating layer of said solid lubricant are exposed on the obverse surface in mixed form;
(f) winding said outer layer forming member around an outer peripheral surface of said tubular base member with said coating layer of said solid lubricant placed on an outer side, so as to form a cylindrical preform; and
(g) fitting said cylindrical preform over an outer peripheral surface of a core of a die, placing said core into said die, and compression-forming said cylindrical preform in said die in an axial direction of said core,
wherein said spherical annular base member is formed such that a heat-resistant material containing expanded graphite and said reinforcing member made from said metal wire net are compressed and intertwined with each other so as to be provided with structural integrity, and
wherein, in said outer layer, a heat-resistant material containing expanded graphite, said solid lubricant constituted of the lubricating composition containing at least 70 to 85 wt. % of hexagonal boron nitride, 0.1 to 10 wt. % of boron oxide, and 5 to 20 wt. % of hydrated alumina, and said reinforcing member made from said metal wire net are compressed such that said solid lubricant and said heat-resistant material are filled in the meshes of said metal wire net of said reinforcing member, and said solid lubricant, said heat-resistant material, and said reinforcing member are integrally formed in mixed form, an outer surface of said outer layer being formed into the smooth surface in which the surface constituted of said reinforcing member and the surface constituted of said solid lubricant are present in mixed form.

9. The method of manufacturing a spherical annular seal member according to claim 8, wherein said aqueous dispersion contains as a solid content a lubricating composition in which, in a lubricating composition containing 70 to 85 wt. % of hexagonal boron nitride, 0.1 to 10 wt. % of boron oxide, and 5 to 20 wt. % of hydrated alumina, polytetrafluoroethylene resin powder is contained at a rate of not more than 200 parts by weight with respect to 100 parts by weight of that lubricating composition.

10. The method of manufacturing a spherical annular seal member according to claim 8, wherein said aqueous dispersion contains as a solid content a lubricating composition in which, in a lubricating composition containing 70 to 85 wt. % of hexagonal boron nitride, 0.1 to 10 wt. % of boron oxide, and 5 to 20 wt. % of hydrated alumina, polytetrafluoroethylene resin powder is contained at a rate of 50 to 150 parts by weight with respect to 100 parts by weight of that lubricating composition.

11. The method of manufacturing a spherical annular seal member according to claim 8, wherein hydrated alumina is selected from alumina monohydrate, alumina trihydrate, and pseudoboehmite.

12. The method of manufacturing a spherical annular seal member according to claim 8, wherein, in said spherical annular base member and said outer layer, said reinforcing member made from said metal wire net is contained at a rate of 40 to 65 wt. %, said lubricating composition and said heat-resistant material containing expanded graphite are contained at a rate of 35 to 60 wt. %, and said heat-resistant material and said solid lubricant in said spherical annular base member and said outer layer have a density of 1.20 to 2.00 Mg/m$^3$.

13. The method of manufacturing a spherical annular seal member according to claim 8, wherein, in said outer layer, said reinforcing member made from said metal wire net is contained at a rate of 60 to 75 wt. %, and said solid lubricant and said heat-resistant material containing expanded graphite are contained at a rate of 25 to 40 wt. %.

14. The method of manufacturing a spherical annular seal member according to claim 8, wherein said heat-resistant material contains expanded graphite and at least one of 0.05 to 5.0 wt. % of phosphorus pentoxide and 1.0 to 16.0 wt. % of a phosphate.

* * * * *